US012559649B2

(12) United States Patent
Rahme et al.

(10) Patent No.: US 12,559,649 B2
(45) Date of Patent: Feb. 24, 2026

(54) ACRYLATE STRUCTURAL ADHESIVE

(71) Applicant: SciGrip Adhesives Ltd., Washington (GB)

(72) Inventors: Roland Rahme, Strasbourg (FR); Eric Elkaim, Mussig (FR); Estelle Ebersohl, Kirrwiller (FR)

(73) Assignee: SciGrip Adhesives Ltd., Washington (GB)

( * ) Notice: Subject to any disclaimer, the term of this patent is extended or adjusted under 35 U.S.C. 154(b) by 848 days.

(21) Appl. No.: 17/433,411

(22) PCT Filed: Feb. 26, 2020

(86) PCT No.: PCT/EP2020/055055
§ 371 (c)(1),
(2) Date: Aug. 24, 2021

(87) PCT Pub. No.: WO2020/178105
PCT Pub. Date: Sep. 10, 2020

(65) Prior Publication Data
US 2022/0135844 A1      May 5, 2022

(30) Foreign Application Priority Data

Mar. 1, 2019    (EP) .................................... 19160166
Apr. 30, 2019    (EP) .................................... 19171839

(51) Int. Cl.
| | |
|---|---|
| *C09J 4/06* | (2006.01) |
| *C08F 220/14* | (2006.01) |
| *C08K 5/14* | (2006.01) |
| *C08L 53/02* | (2006.01) |

(52) U.S. Cl.
CPC ............... *C09J 4/06* (2013.01); *C08F 220/14* (2013.01); *C08K 5/14* (2013.01); *C08L 53/02* (2013.01); *C08L 2207/53* (2013.01)

(58) Field of Classification Search
CPC .. C09J 4/06; C08K 5/14; C08F 220/06; C08F 220/14; C08F 287/00; C08F 290/048; C08L 2207/53
See application file for complete search history.

(56) References Cited

U.S. PATENT DOCUMENTS

2013/0292054 A1    11/2013    Curet

FOREIGN PATENT DOCUMENTS

| | | |
|---|---|---|
| CN | 102329574 A | 1/2012 |
| CN | 104449418 A | 3/2015 |
| CN | 105713543 A | 6/2016 |
| CN | 106189886 A | 12/2016 |
| EP | 3412743 A1 | 12/2018 |

OTHER PUBLICATIONS

India Examination Report dated Feb. 1, 2023, Application No. 202137038534.
International Preliminary Report on Patentability dated Sep. 16, 2021, Application No. PCT/EP2020/055055.
International Search Report & Written Opinion dated Apr. 22, 2020, Application No. PCT/EP2020/055055.
Chinese Second Office Action dated Jan. 20, 2023, Application No. 202080032387.2.

*Primary Examiner* — Fred M Teskin
(74) *Attorney, Agent, or Firm* — LOEB & LOEB LLP

(57) ABSTRACT

The invention relates to a two-component structural adhesive, i.e. to a two-component system of a first component and a second component spatially separated from one another, wherein the reaction of the first component and the second component after mixing results in a structural adhesive. The first component comprises at least four of a (meth)acrylic acid, a $C_{1-6}$-alkyl (meth)acrylate, a cycloalkyl (meth)acrylate, a hydroxy-$C_{1-6}$-alkyl (meth)acrylate, and/or a glycolether (meth)acrylate. The second component comprises a peroxide polymerization initiator. Additionally, the first component and/or the second component comprises at least two toughening agents (a first toughening agent and a second toughening agent); the second toughening agent differing from the first toughening agent; a first impact modifier; and optionally a second impact modifier differing from the first impact modifier.

15 Claims, No Drawings

ACRYLATE STRUCTURAL ADHESIVE

The present application is a 371 national stage filing of International Application No. PCT/EP2020/055055, filed Feb. 26, 2020, which claims priority to EP Application Serial No. 19171839.4, filed Apr. 30, 2019, and EP Application No. 19160166.5, filed Mar. 1, 2019, whose disclosure is incorporated by reference in their entirety.

The invention relates to a two-component structural adhesive, i.e. to a two-component system of a first component and a second component spatially separated from one another, wherein the reaction of the first component and the second component after mixing results in a structural adhesive. The first component comprises at least three, preferably at least four of a (meth)acrylic acid, a $C_{1-6}$-alkyl (meth) acrylate, a cycloalkyl (meth)acrylate, a hydroxy-$C_{1-6}$-alkyl (meth)acrylate, and a glycolether (meth)acrylate. The second component comprises a peroxide polymerization initiator. Additionally, the first component and/or the second component comprises at least one, preferably at least two, more preferably at least three and most preferably all four of a first toughening agent; a second toughening agent differing from the first toughening agent; a first impact modifier; and a second impact modifier differing from the first impact modifier.

The use of structural adhesives has significantly grown in recent years along with the use of composites and combinations of different materials to create lightweight components. Bond designs for these lightweight constructions become more complex and sometimes designers cannot avoid undesirable peel forces.

US 2006/0205850 relates to an adhesive formulation including an acrylate monomer and/or a methacrylate monomer, a chlorosulfonated polymer resin, and a reducing agent. The adhesive also includes a cycloheteroatom zirconate or a cycloheteroatom titannate, which is utilized as a cure profile regulator. Further, the adhesive includes toughening-agent copolymers having a very low $T_g$ to increase impact strength of the cured adhesives at low temperatures.

US 2006/0252866 relates to adhesive formulations having acrylate monomer or methacrylate monomer, or mixtures thereof, and having a reducing agent and an initiator (e.g., peroxide). The formulations may include a chelating agent solution to improve storage stability and other properties.

US 2013/292054 relates to a composition for a structural acrylic adhesive that comprises an adhesion promoter including a phosphate ester and a high molecular-weight polyamine as a polymerization accelerator.

US 2015/0376473 relates to a two part adhesive formulation that has an adhesive part including methylmethacrylate monomer, an antioxidant, a cure inhibitor, and a polyfunctional monomer amount of dimethacrylate monomer, trimethacrylate monomer, or a combination thereof. An activator part includes methylmethacrylate monomer, and a cure accelerator. A toughening agent and an impact modifier is present in at least one of the adhesive part or the activator part.

EP 3 412 743 relates to an adhesive composition which comprises carbon nanotubes and is said to exhibit high adhesive strength due to excellent lap shear strength.

CN 102 329 574 relates to a tackiness agent comprising components A and B, wherein the proportion of the components A and B is 1:1; the component A comprises the following compositions by weight percent: 2-5% of MAA (methyl acrylic acid), 35-45% of MMA (methyl methacrylate), 10-15% of hydroxyethyl methacrylate, 5-10% of ethylene glycol dimethacrylate, 15-22% of toughening resin, 0-30% of elastomer and 2-5% of initiator; and the component B comprises the following compositions by weight percent: 2-5% of MAA, 15-20% of hydroxyethyl methacrylate, 6-10% of organosilicon polymer, 35-45% of MMA, 15-22% of toughening resin, 0-30% of elastomer and 0.8-1.5% of accelerator.

CN 104 449 418 relates to an acrylate structural adhesive consisting of an initiator (component A) and an accelerant (component B) according to a ratio of 1:1, wherein the initiator (component A) comprises the following components: a (methyl)acrylate type monomer or oligomer, a toughening tackifier, an oxidant for an oxidation-reduction system, a stabilizer and other auxiliary agents; and the accelerant (component B) comprises the following components: a (methyl)acrylate type monomer or oligomer, (methyl)acrylic acid, (methyl)acrylic acid phosphate ester, a toughening tackifier, a reducer for an oxidation-reduction system, a stabilizer and other auxiliary agents.

CN 105 713 543 relates to a high-impact-resistance acrylate structural adhesive containing rigid functional groups provided by hydrogenated bisphenol A and methacrylate functional groups which can enhance the curing pull strength and impact resistance.

CN 106 189 886 relates to a high-toughness transparent two-component acrylate adhesive comprising two components A and B, wherein the component A is prepared from 60.0 to 80.0% of polymerized monomer, 0 to 10.0% of toughened rubber, 0 to 15.0% of reinforced resin, 10.0 to 35.0% of transparency enhancing agent, 2.0 to 5.0% of reducing accelerator and 0 to 0.01% of stabilizing agent; the component B is prepared from 60.0 to 80.0% of polymerized monomer, 0 to 20.0% of reinforced resin, 5.0 to 35.0% of transparency enhancing agent, 2.0 to 5.5% of curing agent and 0 to 0.1% of stabilizing agent.

The adhesive compositions of the prior art are not satisfactory in every respect and there is a demand for improved structural adhesives.

The polymerization of acrylic monomers in structural adhesives is typically an exothermic process such that the two-component system, after the first component and the second component have been mixed with one another, is heated in the course of polymerization and curing. As heat dissipation is slow, the temperature rises especially when curing times are short. In conventional structural adhesives, the increased temperature may cause evaporation of volatile not yet polymerized constituents such as methyl methacrylate (MMA) having a boiling point around 105° C. only. Evaporation does not only result in a change of composition but especially can cause bubble formation that may significantly deteriorate the performance of the structural adhesive e.g. with respect to mechanical strength. This issue may become especially problematic when the content of volatile constituents such as MMA in the two-component system is comparatively high and when the adhesive is intended to be used for high gap-filling, e.g. of up to 100 mm, at short open times and short times to handling strength, respectively.

Further, conventional structural adhesives do not provide satisfactory elongation with high Young's modulus (also referred to as "modulus of elasticity" or "tensile modulus"). It would principally be desirable to achieve an elongation of at least 80% at a Young's modulus of at least 700 MPa when determined according to ASTM method D638.

Still further, conventional structural adhesives do not provide a satisfactory yield strength (determined e.g. according to SED Method of Measuring Yield Strength of Adhesives and Other Materials, P. Albrecht et al., Journal of ASTM International, November/December 2005, Vol.

2(10), pp. 35 ff), a satisfactory sagging resistance (determined e.g. according to ASTM test method D4400) and/or a satisfactory threshold stress (determined e.g. according to ASTM method D3433) at low viscosities (determined e.g. according to ASTM method D5125). Such conventional materials tend to sag or due to their increased viscosity are difficult to extrude.

Furthermore, conventional structural adhesives do not provide high T-peel strength (e.g. T-peel strength of at least 8 N/mm when determined according to ASTM D1876-08 (2015)) and high wedge impact resistance (2 m/s at 23° C.) (e.g. a cleavage energy>7 J, DYNAMIC RESISTANCE TO CLEAVAGE>20 N/mm determined according to the impact wedge-peel (IWP) test ISO 11343 method) at a high Young's modulus (e.g. a Young's modulus of at least 700 MPa and a tensile strength>15 MPa when determined according to ASTM method D638).

It is an object of the invention to provide structural adhesives having advantages compared to the structural adhesives of the prior art. The structural adhesives should provide excellent mechanical performance, especially in terms of elongation at break, T-peel strength and shear strength, and should be useful for high gap-filling without boiling, i.e. without or at least with reduced bubble formation due to heat formation upon curing, at short working times and fixture times. Further, the structural adhesives should be low in odor.

These objects have been achieved by the subject-matter of the patent claims.

It has been surprisingly found that especially the combination of one or two toughening agents, optionally together with one or two impact modifiers in two-component structural adhesives provides improved mechanical properties, particularly with respect to elongation at break, yield strength, threshold stress and sagging.

Further, it has been surprisingly found that the combination of monomers, i.e. (meth)acrylic acid, $C_{1-6}$-alkyl (meth)acrylate, cycloalkyl (meth)acrylate, and hydroxy-$C_{1-6}$-alkyl (meth)acrylate, which represents a mixture of monomers having a comparatively high boiling points with monomers having a comparatively low boiling point, provides a good compromise with regard to flexibility and rigidity for the structural adhesive. This combination of monomers allows to decrease the relative content of $C_{1-6}$-alkyl (meth)acrylate, especially of MMA, without at the same time deteriorating adhesive performance. This combination still allows for short open times (e.g. of about 4-6 min), but suppresses bubble formation even at high gaps. Thus, the present invention unexpectedly provides very fast curing structural adhesives that are suitable to fill high gaps without boiling. This is a significant advantage compared to conventional structural adhesives having high content of MMA amounting to 60 wt.-% and even more. Further, this combination of monomers makes it possible to provide a structural adhesive with less MMA odor compared to conventional structural adhesives.

Still further, it has been surprisingly found that a combination of a liquid toughening agent and a solid toughening agent provides excellent results for elongation (more than 80% at a Young's modulus of more than 700 MPa when determined according to ASTM method D638).

Yet further, it has been surprisingly found that a liquid toughening agent provides the structural adhesive with excellent yield strength and threshold stress without at the same time increasing the viscosity of the combined first component and second component in the uncured state. Therefore, the liquid toughening agent has the additional advantage that non sagging materials can be prepared which at the same time are easy to extrude.

Furthermore, it has been surprisingly found that a combination of two impact modifiers, especially at a comparatively high weight content, provides excellent T-Peel strength (at least 8 N/mm determined according to ASTM D1876-08(2015)) and wedge impact resistance (e.g. a cleavage energy>7 J, DYNAMIC RESISTANCE TO CLEAVAGE>20 N/mm, total energy>12N when determined according to the impact wedge-peel (IWP) test ISO 11343 method) without decreasing the Young's modulus (more than 700 MPa when determined according to ASTM method D638).

Moreover, it has been surprisingly found that the impact modifier(s) may be used to control the viscosity of the first component and the second component. Thus, it is not necessary to employ fillers in order to control and adjust viscosity.

A first aspect of the invention relates to a two-component system of (i) a first component comprising at least two, preferably at least three and more preferably at least four of a (meth)acrylic acid, preferably methacrylic acid or acrylic acid;

a $C_{1-6}$-alkyl (meth)acrylate, preferably methyl (meth)acrylate or ethyl (meth)acrylate, more preferably methyl methacrylate;

a hydroxy-$C_{1-6}$-alkyl (meth)acrylate, preferably hydroxyethyl (meth)acrylate or hydroxypropyl (meth)acrylate;

a cycloalkyl (meth)acrylate, preferably isobornyl acrylate or isobornyl methacrylate; and a glycolether (meth)acrylate according to general formula (I), $$CH_2{=}CR{-}C({=}O){-}O{-}[CH_2CH_2{-}O]_n{-}C_mH_{2m+1}, \quad\quad (I)$$

wherein R is —H or —CH$_3$, preferably —CH$_3$; wherein index n is an integer within the range of from 1 to 12, preferably 2; and wherein index m is an integer within the range of from 1 to 8, preferably 4; preferably butyldiglycol methacrylate; and (ii) a second component comprising a peroxide polymerization initiator;

wherein the first component and/or the second component additionally comprise at least one, preferably at least two, more preferably at least three and most preferably all four of a first toughening agent;

a second toughening agent differing from the first toughening agent;

a first impact modifier; and a second impact modifier differing from the first impact modifier;

wherein the first component and the second component are spatially separated from one another; and wherein the reaction of the first component and the second component after mixing results in a structural adhesive.

The invention provides fast-curing two-component toughened structural adhesives. The structural adhesives provide primerless adhesion to most metals, thermoplastics and composites. The ratio between open time and time to handling strength has been optimized versus other two-component systems on the market thereby minimizing cycle times. The two-component systems according to the invention do not boil at higher bonding gaps—an ideal solution for repair or backfill of large composite structures. Due to their low odor, the two-component systems according to the invention can be used in metal-working shops and other places where typical odor such as distinctive MMA odor is restricted. The two-component systems according to the invention are preferably thixotropic also creating value due to fast-mixing and rapid extrusion without sacrificing non-sag properties.

The first component of the two-component system according to the invention comprises at least one, preferably at least two, more preferably at least three and still more preferably at least four of a (meth)acrylic acid, preferably methacrylic acid or acrylic acid;

a $C_{1-6}$-alkyl (meth)acrylate, preferably methyl (meth) acrylate or ethyl (meth)acrylate, more preferably methyl methacrylate;

a hydroxy-$C_{1-6}$-alkyl (meth)acrylate, preferably hydroxyethyl (meth)acrylate or hydroxypropyl (meth)acrylate;

a cycloalkyl (meth)acrylate, preferably isobornyl acrylate or isobornyl methacrylate; and a glycolether (meth)acrylate according to general formula (I) as defined above; preferably butyldiglycol methacrylate.

In a preferred embodiment, the first component of the two-component system according to the invention comprises at least three monomers, namely a (meth)acrylic acid, preferably methacrylic acid or acrylic acid;

a $C_{1-6}$-alkyl (meth)acrylate, preferably methyl (meth) acrylate or ethyl (meth)acrylate, more preferably methyl methacrylate; and a hydroxy-$C_{1-6}$-alkyl (meth)acrylate, preferably hydroxyethyl (meth)acrylate or hydroxypropyl (meth)acrylate.

Preferably, the first component of the two-component system of a according to the invention comprises a (meth)acrylic acid, a $C_{1-6}$-alkyl (meth)acrylate, a hydroxy-$C_{1-6}$-alkyl (meth)acrylate, optionally, a cycloalkyl (meth)acrylate; and/or optionally, a glycolether (meth)acrylate according to general formula (I) as defined above; preferably butyldiglycol methacrylate.

Preferably, the first component of the two-component system of a according to the invention comprises (A) a (meth)acrylic acid, preferably methacrylic acid or acrylic acid; (B) a C1-6-alkyl (meth)acrylate, preferably methyl (meth)acrylate or ethyl (meth)acrylate, more preferably methyl methacrylate; and (C) a hydroxy-C1-6-alkyl (meth) acrylate, preferably hydroxyethyl (meth)acrylate or hydroxypropyl (meth)acrylate; preferably wherein the relative weight ratio (A):(B):(C) is from about 10:1:1 to about 1:10:1 to about 1:1:10; more preferably from about 9:1:1 to about 1:9:1 to about 1:1:9; still more preferably from about 8:1:1 to about 1:8:1 to about 1:1:8.

Preferably, the first component of the two-component system of a according to the invention comprises (A) a C1-6-alkyl (meth)acrylate, preferably methyl (meth)acrylate or ethyl (meth)acrylate, more preferably methyl methacrylate; (B) a hydroxy-C1-6-alkyl (meth)acrylate, preferably hydroxyethyl (meth)acrylate or hydroxypropyl (meth)acrylate; and (C) a cycloalkyl (meth)acrylate, preferably isobornyl acrylate or isobornyl methacrylate; preferably wherein the relative weight ratio (A):(B):(C) is from about 10:1:1 to about 1:10:1 to about 1:1:10; more preferably from about 9:1:1 to about 1:9:1 to about 1:1:9; still more preferably from about 8:1:1 to about 1:8:1 to about 1:1:8.

In another preferred embodiment, the first component of the two-component system according to the invention comprises at least three monomers, namely (A) a C1-6-alkyl (meth)acrylate, preferably methyl (meth)acrylate or ethyl (meth)acrylate, more preferably methyl methacrylate; (B) a hydroxy-C1-6-alkyl (meth)acrylate, preferably hydroxyethyl (meth)acrylate or hydroxypropyl (meth)acrylate; and (C) a glycolether (meth)acrylate according to general formula (I) as defined above; preferably butyldiglycol methacrylate; preferably wherein the relative weight ratio (A):(B):(C) is from about 10:1:1 to about 1:10:1 to about 1:1:10; more preferably from about 9:1:1 to about 1:9:1 to about 1:1:9; still more preferably from about 8:1:1 to about 1:8:1 to about 1:1:8.

In still another preferred embodiment, the first component of the two-component system according to the invention comprises at least four monomers, namely a (meth)acrylic acid, preferably methacrylic acid or acrylic acid;

a $C_{1-6}$-alkyl (meth)acrylate, preferably methyl (meth) acrylate or ethyl (meth)acrylate, more preferably methyl methacrylate;

a hydroxy-$C_{1-6}$-alkyl (meth)acrylate, preferably hydroxyethyl (meth)acrylate or hydroxypropyl (meth)acrylate; and a cycloalkyl (meth)acrylate, preferably isobornyl acrylate or isobornyl methacrylate.

In yet another preferred embodiment, the first component of the two-component system according to the invention comprises at least four monomers, namely a (meth)acrylic acid, preferably methacrylic acid or acrylic acid;

a $C_{1-6}$-alkyl (meth)acrylate, preferably methyl (meth) acrylate or ethyl (meth)acrylate, more preferably methyl methacrylate;

a hydroxy-$C_{1-6}$-alkyl (meth)acrylate, preferably hydroxyethyl (meth)acrylate or hydroxypropyl (meth)acrylate; and a glycolether (meth)acrylate according to general formula (I), preferably butyldiglycol (meth)acrylate.

In a preferred embodiment, the first component of the two-component system according to the invention comprises a (meth)acrylic acid, preferably methacrylic acid or acrylic acid, and a $C_{1-6}$-alkyl (meth)acrylate, preferably methyl (meth)acrylate or ethyl (meth)acrylate, more preferably methyl methacrylate, wherein preferably the relative weight ratio of the (meth)acrylic acid to the $C_{1-6}$-alkyl (meth)acrylate is within the range of 1:7±6, more preferably 1:7±5, still more preferably 1:7±4, yet more preferably 1:7±3, even more preferably 1:7±2, most preferably 1:7±1, and in particular 1:7±0.5.

In a preferred embodiment, the first component of the two-component system according to the invention comprises a (meth)acrylic acid, preferably methacrylic acid or acrylic acid, and a hydroxy-$C_{1-6}$-alkyl (meth)acrylate, preferably hydroxyethyl (meth)acrylate or hydroxypropyl (meth)acrylate, wherein preferably the relative weight ratio of the (meth)acrylic acid to the hydroxy-$C_{1-6}$-alkyl (meth) acrylate is within the range of 1:2.5±2.4, more preferably 1:2.5±2.1, still more preferably 1:2.5±1.8, yet more preferably 1:2.5±1.5, even more preferably 1:2.5±1.2, most preferably 1:2.5±0.9, and in particular 1:2.5±0.6.

In a preferred embodiment, the first component of the two-component system according to the invention comprises a (meth)acrylic acid, preferably methacrylic acid or acrylic acid, and a cycloalkyl (meth)acrylate, preferably isobornyl acrylate or isobornyl methacrylate, wherein preferably the relative weight ratio of the (meth)acrylic acid to the cycloalkyl (meth)acrylate is within the range of 7:1 to 1:7, more preferably 6:1 to 1:6, still more preferably 5:1 to 1:5, yet more preferably 4:1 to 1:4, even more preferably 3:1 to 1:3, most preferably 2:1 to 1:2, and in particular 1.5:1 to 1:1.5.

In a preferred embodiment, the first component of the two-component system according to the invention comprises a (meth)acrylic acid, preferably methacrylic acid or acrylic acid, and a glycolether (meth)acrylate according to general formula (I), preferably butyldiglycol (meth)acrylate, wherein preferably the relative weight ratio of the (meth) acrylic acid to the glycolether (meth)acrylate is within the range of 1.5±1.0:1, more preferably 1.5±0.9:1, still more preferably 1.5±0.8:1, yet more preferably 1.5±0.7:1, even more preferably 1.5±0.6:1, most preferably 1.5±0.5:1, and in particular 1.5±0.4:1.

In a preferred embodiment, the first component of the two-component system according to the invention comprises a $C_{1-6}$-alkyl (meth)acrylate, preferably methyl (meth) acrylate or ethyl (meth)acrylate, more preferably methyl methacrylate, and a hydroxy-$C_{1-6}$-alkyl (meth)acrylate, preferably hydroxyethyl (meth)acrylate or hydroxypropyl (meth)acrylate, wherein preferably the relative weight ratio of the $C_{1-6}$-alkyl (meth)acrylate to the hydroxy-$C_{1-6}$-alkyl (meth)acrylate is within the range of 2.5±2.4:1, more preferably 2.5±2.1:1, still more preferably 2.5±1.8:1, yet more preferably 2.5±1.5:1, even more preferably 2.5±1.2:1, most preferably 2.5±0.9:1, and in particular 2.5±0.6:1.

In a preferred embodiment, the two-component system according to the invention is free of at least one or both of hydroxyethyl methacrylate and hydroxypropyl methacrylate.

In a preferred embodiment, the first component of the two-component system according to the invention comprises a $C_{1-6}$-alkyl (meth)acrylate, preferably methyl (meth) acrylate or ethyl (meth)acrylate, more preferably methyl methacrylate, and a cycloalkyl (meth)acrylate, preferably isobornyl acrylate or isobornyl methacrylate, wherein preferably the relative weight ratio of the $C_{1-6}$-alkyl (meth) acrylate to the cycloalkyl (meth)acrylate is within the range of 8±7:1, more preferably 8±6:1, still more preferably 8±5:1, yet more preferably 8±4:1, even more preferably 8±3:1, most preferably 8±2:1, and in particular 8±0.5:1.

In a preferred embodiment, the first component of the two-component system according to the invention comprises a $C_{1-6}$-alkyl (meth)acrylate, preferably methyl (meth) acrylate or ethyl (meth)acrylate, more preferably methyl methacrylate, and a glycolether (meth)acrylate according to general formula (I), preferably butyldiglycol (meth)acrylate, wherein preferably the relative weight ratio of the $C_{1-6}$-alkyl (meth)acrylate to the glycolether (meth)acrylate is within the range of 6±5:1, more preferably 6±4:1, still more preferably 6±3:1, yet more preferably 6±2:1, even more preferably 6±1.5:1, most preferably 6±1:1, and in particular 6±0.5:1.

In a preferred embodiment, the first component of the two-component system according to the invention comprises a hydroxy-$C_{1-6}$-alkyl (meth)acrylate, preferably hydroxyethyl (meth)acrylate or hydroxypropyl (meth)acrylate, and a cycloalkyl (meth)acrylate, preferably isobornyl acrylate or isobornyl methacrylate, wherein preferably the relative weight ratio of the hydroxy-$C_{1-6}$-alkyl (meth)acrylate to the cycloalkyl (meth)acrylate is within the range of 3±2.8:1, more preferably 3±2.4:1, still more preferably 3±2.0:1, yet more preferably 3±1.6:1, even more preferably 3±1.2:1, most preferably 3±0.8:1, and in particular 3±0.4:1.

In a preferred embodiment, the first component of the two-component system according to the invention comprises a hydroxy-$C_{1-6}$-alkyl (meth)acrylate, preferably hydroxyethyl (meth)acrylate or hydroxypropyl (meth)acrylate, and a glycolether (meth)acrylate according to general formula (I), preferably butyldiglycol (meth)acrylate, wherein preferably the relative weight ratio of the hydroxy-$C_{1-6}$-alkyl (meth)acrylate to the glycolether (meth)acrylate is within the range of 2.0±1.8:1, more preferably 2.0±1.6:1, still more preferably 2.0±1.4:1, yet more preferably 2.0±1.2:1, even more preferably 2.0±1.0:1, most preferably 2.0±0.8:1, and in particular 2.0±0.6:1.

The first component and/or the second component of the two-component system according to the invention comprise at least one, preferably at least two, more preferably at least three and most preferably all four of a first toughening agent; a second toughening agent differing from the first toughening agent; a first impact modifier; and a second impact modifier differing from the first impact modifier.

In preferred embodiments, the first component and/or the second component of the two-component system according to the invention comprise a first toughening agent; or a first impact modifier.

In preferred embodiments, the first component and/or the second component of the two-component system according to the invention comprise a first toughening agent and a second toughening agent differing from the first toughening agent; or a first toughening agent and a first impact modifier; or a first impact modifier and a second impact modifier differing from the first impact modifier.

In preferred embodiments, the first component and/or the second component of the two-component system according to the invention comprise a first toughening agent and a second toughening agent differing from the first toughening agent and a first impact modifier; or a first toughening agent and a first impact modifier and a second impact modifier differing from the first impact modifier.

In a particularly preferred embodiment, the first component and/or the second component of the two-component system according to the invention comprise a first toughening agent and a second toughening agent differing from the first toughening agent and a first impact modifier and a second impact modifier differing from the first impact modifier.

The two-component system according to the invention comprises a first component and a second component. While it is principally possible that the two-component system comprises further components in addition to the first and second component, preferably the two-component system essentially consists of the first component and the second component.

In its non-activated state, the first component and the second component are spatially separated from one another. In this non-activated state the two-component system may be stored typically having a shelf-life of at least several months. For example, the two-component system may be made commercially available in a cartridge comprising two separate chambers where the first component is contained in a first chamber of the cartridge and the second component is contained in a second chamber of the cartridge.

In its activated state, the first component and the second component are mixed with one another thereby inducing chemical reaction that finally results in formation of a structural adhesive. For example, when being contained in spatially separated chambers of a cartridge, the first component may be mixed with the second component when exiting the cartridge e.g. through a nozzle or die for application to a substrate. As the first component and the second component are mixed with one another, the ingredients thereof can chemically react with one another.

As chemical reaction takes some time that highly depends upon the ingredients of the two-component system, it is typically distinguished between open time and curing time. The open time is usually regarded as the time window immediately after mixing during which the two-component system may be applied to a substrate, flow and may still be deformed. Open time may be regarded as a lag time before chemical reaction has started or at least has proceeded to a certain extent at which applying and processing the two-component system becomes difficult because of advancing polymerization and curing. The curing time is usually regarded as the time window following the open time until the two-component system has completely reacted, i.e. until polymerization and curing reactions have been completed. The open time and the curing time may independently of one another last from a few minutes to several hours and there is no clear-cut between open time and curing time; transition may be smooth.

For certain industrial applications it can be desirable to specifically adjust open time and curing time. In certain embodiments it can be desirable to have an open time within the range of from 1 to 10 minutes and subsequently to have a curing time that is as short as possible. When using the two-component system e.g. on an assembly line, this will provide sufficient time for applying the two-component system to the desired substrate, but also will allow for further processing after a short period or even immediately thereafter, as polymerization and curing proceeds quickly. Thus, polymerization and curing will not significantly delay operation on the assembly line.

For the purpose of the specification, a structural adhesive is to be regarded as an adhesive that can be used to produce a load-bearing joint. Preferably, a structural adhesive is useful for engineering applications where joints typically have lap shear strengths of at least 1 MPa and, more normally, at least 10 MPa. Structural adhesives are used extensively in automotive and aircraft industry for bonding metal-to-metal, metal-to-composite and composite-to-composite parts.

A skilled person recognizes that in its non-activated state, certain ingredients of the two-component system can be present in either component without inducing premature chemical reaction. Thus, unless these components comprise reactive functional groups, it makes no big difference whether these ingredients are contained in the first component or in the second component or in both the first and the second component. This is particularly the case for the first toughening agent, the second toughening agent, the first impact modifier, and the second impact modifier.

However, the radically polymerizable monomers of the two component system on the one hand and the radical polymerization initiator of the two component system on the other hand should be stored separate of one another. For that reason, the first component of the two-component system comprises the monomers such as (meth)acrylic acid, $C_{1-6}$-alkyl (meth)acrylate, cycloalkyl (meth)acrylate, and/or a hydroxy-$C_{1-6}$-alkyl (meth)acrylate; whereas the second component comprises the peroxide polymerization initiator.

Unless expressly stated otherwise, all percentages are weight percentages and are relative to the total weight of the two-component system, i.e. the overall weight of the first and second component.

Unless expressly stated otherwise, all standard test methods such as ASTM refer to the most recent edition that is valid on Jan. 1, 2019.

Unless expressly stated otherwise, "(meth)" within chemical nomenclature of acrylic acid and acrylic acid derivatives such as acrylic acid esters (i.e. acrylates) means either absence or presence of "meth", i.e. either acrylic acid and the corresponding derivatives of acrylic acid, or methacrylic acid and the corresponding derivatives of methacrylic acid. In other words, e.g. "(meth)acrylic acid" means "acrylic acid or methacrylic acid", and likewise "methyl (meth)acrylate" means "methyl acrylate or methyl methacrylate" (i.e. acrylic acid methyl ester or methacrylic acid methyl ester).

The first component of the two-component system according to the invention preferably comprises (meth)acrylic acid, preferably methacrylic acid or acrylic acid.

It has been found that (meth)acrylic acid, preferably methacrylic acid or acrylic acid, may inter alia act as adhesion promoter. Further, when the two-component system comprises other ingredients that are capable of reacting with carboxylic functional groups, such as free epoxy functional groups of epoxy resins, the resultant crosslinks may further improve the properties of the structural adhesive.

In a preferred embodiment, the two-component system according to the invention comprises methacrylic acid but no acrylic acid. In another preferred embodiment, the two-component system according to the invention comprises acrylic acid but no methacrylic acid.

Preferably, the content of the (meth)acrylic acid, preferably methacrylic acid or acrylic acid, is within the range of $5.0\pm4.5$ wt.-%, more preferably $5.0\pm4.0$ wt.-%, still more preferably $5.0\pm3.5$ wt.-%, yet more preferably $5.0\pm3.0$ wt.-%, even more preferably $5.0\pm2.5$ wt.-%, most preferably $5.0\pm2.0$ wt.-%, and in particular $5.0\pm1.5$ wt.-%, in each case relative to the total weight of the two-component system. When the two-component system comprises more than a single (meth)acrylic acid, i.e. a combination a acrylic acid and methacrylic acid, the specified content of (meth)acrylic acid refers to the overall content of all (meth)acrylic acids that are contained in the two-component system.

Optionally, besides the (meth)acrylic acid, one or more other organic acids, such as carboxylic acids, may be employed in the adhesive formulation to enhance adhesion of the adhesive to the substrates or components. Exemplary carboxylic acids include maleic acid, acrylic acid, crotonic acid, fumaric acid, malonic acid, and the like. Additional examples of these organic or carboxylic acids are acetylene dicarboxylic acid, dibromo maleic citranoic acid, mesaconic acid, and oxalic acid.

By adding (meth)acrylic acid and optionally one or more of the above carboxylic acids, particularly strong organic carboxylic acids, the bonding characteristics of the structural adhesive to the subsequently bonded structural components and parts are improved. It is believed that the addition of carboxylic acids promotes adhesion to solvent-resistant and/or heat-resistant plastics, thermosets, thermoplastics, resin/glass composites, resins, fiber reinforced composites, metals, and so on, due to interactions at the molecular level, e.g., through hydrogen bonding, and the like. The addition of water to compositions comprising these acids can increase their effectiveness. These adhesive effects can further be enhanced by heat treatment of the bonds either during or after the bonding step (or both).

The first component of the two-component system according to the invention preferably comprises a $C_{1-6}$-alkyl (meth)acrylate, which is preferably selected from the group consisting of methyl acrylate, methyl methacrylate, ethyl acrylate, ethyl methacrylate, propyl acrylate, propyl methacrylate, butyl acrylate and butyl methacrylate; preferably methyl (meth)acrylate or ethyl (meth)acrylate, more preferably methyl methacrylate.

It has been found that the $C_{1-6}$-alkyl (meth)acrylate, preferably methyl (meth)acrylate or ethyl (meth)acrylate, more preferably methyl methacrylate, may inter alia improve the adhesion of the structural adhesive of plastic substrates. This is therefore particularly advantageous when the structural adhesive is used for bonding metal-to-composite parts or composite-to-composite parts.

Preferably, the two-component system comprises essentially no $C_{1-6}$-alkyl (meth)acrylate other than methyl methacrylate.

Preferably, the content of the $C_{1-6}$-alkyl (meth)acrylate, preferably methyl (meth)acrylate or ethyl (meth)acrylate, more preferably methyl methacrylate, is at most 60 wt.-%, more preferably at most 55 wt.-%, still more preferably at most 50 wt.-%, yet more preferably at most 45 wt.-%, even more preferably at most 40 wt.-%, most preferably at most 35 wt.-%, an in particular at most 30 wt.-%, in each case relative to the total weight of the two-component system.

Preferably, the content of the $C_{1-6}$-alkyl (meth)acrylate, preferably methyl (meth)acrylate or ethyl (meth)acrylate, more preferably methyl methacrylate, is within the range of 25±10 wt.-%, more preferably 25±9.0 wt.-%, still more preferably 25±8.0 wt.-%, yet more preferably 25±7.0 wt.-%, even more preferably 25±6.0 wt.-%, most preferably 25±5.0 wt.-%, and in particular 25±4.0 wt.-%, in each case relative to the total weight of the two-component system. When the two-component system comprises more than a single $C_{1-6}$-alkyl (meth)acrylate, the specified content of $C_{1-6}$-alkyl (meth)acrylate refers to the overall content of all $C_{1-6}$-alkyl (meth)acrylates that are contained in the two-component system.

The first component of the two-component system according to the invention preferably comprises a cycloalkyl (meth)acrylate, which is preferably selected from the group consisting of isobornyl acrylate, isobornyl methacrylate, 1-adamantyl acrylate, 1-adamantyl methacrylate, cyclohexyl acrylate, cyclohexyl methacrylate, methylcyclohexyl acrylate, methylcyclohexyl methacrylate, trimethylcyclohexyl acrylate, trimethylcyclohexyl methacrylate, butylcyclohexyl acrylate, butylcyclohexyl methacrylate, furfuryl acrylate, and furfuryl methacrylate; preferably isobornyl acrylate or isobornyl methacrylate.

It has been found that the cycloalkyl (meth)acrylate, preferably isobornyl acrylate or isobornyl methacrylate, inter alia increases $T_g$ of the structural adhesive.

Preferably, the two-component system comprises essentially no cycloalkyl (meth)acrylate other than isobornyl methacrylate.

Preferably, the content of the cycloalkyl (meth)acrylate, preferably isobornyl acrylate or isobornyl methacrylate, is less than 5.5 wt.-%, more preferably at most 5.0 wt.-%, still more preferably at most 4.8 wt.-%, yet more preferably at most 4.6 wt.-%, even more preferably at most 4.4 wt.-%, most preferably at most 4.2 wt.-%, and in particular at most 4.0 wt.-%, in each case relative to the total weight of the two-component system.

Preferably, the content of the cycloalkyl (meth)acrylate, preferably isobornyl acrylate or isobornyl methacrylate, is within the range of 5.0±4.5 wt.-%, more preferably 5.0±4.0 wt.-%, still more preferably 5.0±3.5 wt.-%, yet more preferably 5.0±3.0 wt.-%, even more preferably 5.0±2.5 wt.-%, most preferably 5.0±2.0 wt.-%, and in particular 5.0±1.5 wt.-%, in each case relative to the total weight of the two-component system. When the two-component system comprises more than a single cycloalkyl (meth)acrylate, the specified content of cycloalkyl (meth)acrylate refers to the overall content of all cycloalkyl (meth)acrylates that are contained in the two-component system.

The first component of the two-component system according to the invention preferably comprises a hydroxy-$C_{1-6}$-alkyl (meth)acrylate, which is preferably selected from the group consisting of hydroxyethyl acrylate, hydroxyethyl methacrylate, hydroxypropyl acrylate, hydroxypropyl methacrylate, hydroxybutyl acrylate, and hydroxybutyl methacrylate; preferably hydroxyethyl (meth)acrylate or hydroxypropyl (meth)acrylate.

It has been found that the hydroxy-$C_{1-6}$-alkyl (meth) acrylate, preferably hydroxyethyl (meth)acrylate or hydroxypropyl (meth)acrylate, inter alia imparts flexibility to the structural adhesive Preferably, the two-component system comprises essentially no hydroxy-$C_{1-6}$-alkyl (meth)acrylate other than hydroxyethyl methacrylate.

Preferably, the content of the hydroxy-$C_{1-6}$-alkyl (meth) acrylate, preferably hydroxyethyl (meth)acrylate or hydroxypropyl (meth)acrylate, is more than 6.0 wt.-%, more preferably at least 6.5 wt.-%, still more preferably at least 7.0 wt.-%, yet more preferably at least 7.5 wt.-%, even more preferably at least 8.0 wt.-%, most preferably at least 8.5 wt.-%, and in particular at least 9.0 wt.-%, in each case relative to the total weight of the two-component system.

Preferably, the content of the hydroxy-$C_{1-6}$-alkyl (meth) acrylate, preferably hydroxyethyl (meth)acrylate or hydroxypropyl (meth)acrylate, is within the range of 10±9.0 wt.-%, more preferably 10±8.0 wt.-%, still more preferably 10±7.0 wt.-%, yet more preferably 10±6.0 wt.-%, even more preferably 10±5.0 wt.-%, most preferably 10±4.0 wt.-%, and in particular 10±3.0 wt.-%, in each case relative to the total weight of the two-component system. When the two-component system comprises more than a single hydroxy-$C_{1-6}$-alkyl (meth)acrylate, the specified content of hydroxy-$C_{1-6}$-alkyl (meth)acrylate refers to the overall content of all hydroxy-$C_{1-6}$-alkyl (meth)acrylates that are contained in the two-component system.

The first component of the two-component system according to the invention preferably comprises a glycolether (meth)acrylate according to general formula (I), $CH_2=CR-C(=O)-O-[CH_2CH_2-O]_n-C_mH_{2m+1}$, wherein R is —H or —$CH_3$, preferably —$CH_3$; wherein index n is an integer within the range of from 1 to 12, preferably 2; and wherein index m is an integer within the range of from 1 to 8, preferably 4.

Preferably, the glycolether (meth)acrylate according to general formula (I) is selected from the group consisting of methylmonoglycol (meth)acrylate, ethylmonoglycol (meth) acrylate, propylmonoglycol (meth)-acrylate, butylmonoglycol (meth)acrylate, methyldiglycol (meth)acrylate, ethyldiglycol (meth)acrylate, propyl-diglycol (meth)acrylate, butyldiglycol (meth)acrylate, methyltriglycol (meth)acrylate, ethyltriglycol (meth)-acrylate, propyltriglycol (meth) acrylate, and butyltriglycol (meth)acrylate; preferably butyldiglycol methacrylate.

It has been found that the glycolether (meth)acrylate according to general formula (I), preferably butyldiglycol methacrylate, inter alia reduces bubble formation at short curing times and/or high gap-filling.

Preferably, the two-component system comprises essentially no glycolether (meth)acrylate according to general formula (I) other than butyldiglycol methacrylate.

In a preferred embodiment, the content of the glycolether (meth)acrylate according to general formula (I), preferably butyldiglycol methacrylate, is within the range of 5.0±4.5 wt.-%, more preferably 5.0±4.0 wt.-%, still more preferably 5.0±3.5 wt.-%, yet more preferably 5.0±3.0 wt.-%, even more preferably 5.0±2.5 wt.-%, most preferably 5.0±2.0 wt.-%, and in particular 5.0±1.5 wt.-%, in each case relative to the total weight of the two-component system.

In another preferred embodiment, the content of the glycolether (meth)acrylate according to general formula (I), preferably butyldiglycol methacrylate, is within the range of 10±9.0 wt.-%, more preferably 10±8.0 wt.-%, still more preferably 10±7.0 wt.-%, yet more preferably 10±6.0 wt.-%, even more preferably 10±5.0 wt.-%, most preferably 10±4.0 wt.-%, and in particular 10±3.0 wt.-%, in each case relative to the total weight of the two-component system. When the two-component system comprises more than a single gly-colether (meth)acrylate according to general formula (I), the specified content of glycolether (meth)acrylate according to general formula (I) refers to the overall content of all glycolether (meth)acrylates according to general formula (I) that are contained in the two-component system.

The second component of the two-component system according to the invention comprises a peroxide polymer-ization initiator, which is preferably selected from the group consisting of benzoyl peroxide, tertbutyl hydroperoxide, di-tertbutyl peroxide, cumene hydroperoxide, dicumene per-oxide, tertbutyl peracetate, tertbutyl perbenzoate, and di-tertbutyl peroxide; preferably benzoyl peroxide or di-tert-butyl peroxide.

Preferably, the two-component system comprises essen-tially no peroxide polymerization initiator other than ben-zoyl peroxide, preferably no radical polymerization initiator, other than benzoyl peroxide.

The two-component system according to the invention is preferably curable at room temperature, i.e. spontaneously starts curing once the first component and the second component have been mixed with one another. Nonetheless, it is also contemplated that curing may be accelerated by subjecting the mixture to elevated temperature.

Preferably, the content of the peroxide polymerization initiator is within the range of 3.5±3.4 wt.-%, more prefer-ably 3.5±3.0 wt.-%, still more preferably 3.5±2.5 wt.-%, yet more preferably 3.5±2.0 wt.-%, even more preferably 3.5±1.5 wt.-%, most preferably 3.5±1.0 wt.-%, and in par-ticular 3.5±0.5 wt.-%, in each case relative to the total weight of the two-component system. When the two-com-ponent system comprises more than a peroxide polymeriza-tion initiator, the specified content of peroxide polymeriza-tion initiator refers to the overall content of all peroxide polymerization initiators that are contained in the two-component system.

Preferably, the two-component system according to the invention comprises a first toughening agent and optionally and preferably, a second toughening agent that differs from the first toughening agent.

For the purpose of the specification, a toughening agent increases the ability of the structural adhesive to absorb energy and plastically deform without fracture. Typical toughening agents are rubbers (elastomers) that can be interspersed as nanoparticles within a polymer matrix to increase the mechanical robustness, or toughness, of the material. Toughening agents are known to the skilled person (see e.g. Bucknall C. B. (1977) Toughened Plastics, Springer; Keskkula H., Paul D. R. (1994) Toughening agents for engineering polymers. In: Collyer A. A. (eds) Rubber Toughened Engineering Plastics. Springer; Arends Ch. (1996) Polymer Toughning, Marcel Dekker).

Elastomers and polymers employed as toughening agents may have a glass transition temperature ($T_g$) of less than −25° C., and advantageously less than −50° C. Further, these toughening agents may beneficially be soluble in the acrylic monomers described above. In general, the elastomers may include synthetic high polymers. Moreover, the elastomers may be supplied commercially as adhesive grades. Elasto-mers and polymers may include polychloroprene (neoprene) and block-copolymers of butadiene or isoprene with styrene, acrylonitrile, acrylates, methacrylates, and the like.

Preferably, the first toughening agent is a liquid toughen-ing agent, i.e. in isolated form at room temperature is a liquid. Preferably, the first toughening agent is a liquid olefinic-terminated elastomer such as homopolymers of butadiene, copolymers of butadiene and at least one mono-mer copolymerizable therewith, for example, styrene, acry-lonitrile, methacrylonitrile (e.g. poly(butadiene-(meth)acry-lonitrile or poly(butadiene-(meth)acrylonitrile-styrene) and mixtures thereof; as well as modified elastomeric polymeric materials, such as butadiene homopolymers and copolymers modified by copolymerization therewith of trace amounts of up to about 5 wt.-% of elastomeric material of at least one functional monomer (such as acrylic acid, methacrylic acid, maleic anhydride, fumaric acid, styrene, and methyl meth-acrylate to give, for example, methacrylate-terminated polybutadiene homopolymers and/or copolymers).

A preferred subgroup of olefinic-terminated elastomers according to the invention are (meth)acrylate-terminated elastomers where a terminal olefinic unsaturation is part of the terminal (meth)acrylate functional group.

Preferably, the first toughening agent is selected from (meth)acrylate terminated butadiene-acrylonitrile copoly-mers, (meth)acrylate (vinyl) terminated butadiene-acryloni-trile copolymers (commercially available e.g. as Hypro™ 2000 X168LC VTB) and, (meth)acrylate-terminated poly (butadiene-acrylonitrile-acrylic acid) terpolymers; prefer-ably a (meth)acrylate terminated butadiene-acrylonitrile copolymer. Preferably, the butadiene acrylonitrile backbone is a random copolymer backbone with a content of more than 50 wt.-% butadiene, more preferably at least 60 wt.-%, still more preferably at least 70 wt.-%, and in particular at least 80 wt.-%, the remainder being acrylonitrile. First toughening agents of this type are commercially available (e.g. Hypro™ 1300 X33LC VTBNX, Hypro™ 1300 X43VTBNX).

Preferably, the content of the first toughening agent is within the range of 8.0±7.5 wt.-%, more preferably 8.0±7.0 wt.-%, still more preferably 8.0±6.5 wt.-%, yet more pref-erably 8.0±6.0 wt.-%, even more preferably 8.0±5.5 wt.-%, most preferably 8.0±5.0 wt.-%, and in particular 8.0±4.5 wt.-%, or 8.0±4.0 wt.-%, or 8.0±3.5 wt.-%, or 8.0±3.0 wt.-%, or 8.0±2.5 wt.-%, or 8.0±2.0 wt.-%, in each case relative to the total weight of the two-component system.

Preferably, the second toughening agent is a solid tough-ening agent, i.e. in isolated form at room temperature is a solid. Preferably, the second toughening agent is selected from styrene-butadiene-styrene block-copolymers (SBS), styrene-isoprene-styrene block-copolymers (SIS), styrene-ethylene-propylene block-copolymers (SEP), styrene-ethyl-ene-butadiene-styrene block-copolymers (SEBS), ethylene-propylene rubbers (EPR), acrylonitrile-butadiene rubbers (NBR), ethylene propylene diene rubbers (EPDM), butadi-ene rubbers (BR), natural rubbers (NR), styrene-butadiene rubbers (SBR), thermoplastic polyolefin elastomers (POE), chlorinated polyethylenes, ethylene-acrylic acid copolymers (EAA), ethylene-vinyl acetate or a mixture of several eth-ylene copolymers (EVA); preferably a styrene-butadiene-styrene block-copolymer (SBS). Second toughening agents of this type are commercially available (e.g. Kraton™

D1102, Kraton™ D1116, Kraton™ D1118, Kraton™ D1133, Kraton™ D1152 ESM, Kraton™ D1153, Kraton™ D1155, Kraton™ D1192).

Preferred second toughening agents include copolymers (e.g., block-copolymers) having a glass transition temperature, $T_g$, of at least one domain in the range of in the range of $-50°$ C. to $-110°$ C. Embodiments of these toughening agents include styrene-butadiene-styrene (SBS) copolymers. Commercial examples of SBS copolymers are Kraton™ D1116, Kraton D1152 ESM and Kratone™ 1184.

Preferably, the two-component system according to the invention essentially does not contain any copolymer or block-copolymer selected from the group consisting of styrene-butadiene rubber (SBR) [other than SBS], styrene-ethylene-butadiene-styrene (SEBS), styrene-isoprene-styrene (SIS), acrylonitrile butadiene styrene copolymers (ABS), acrylonitrile styrene acrylate copolymers (ASA), acrylonitrile-ethylene-propylene-diene-styrene (AES), styrene acrylonitrile (SAN), methyl methacrylate-butadiene-styrene (IVIBS), and styrene-acrylonitrile (SAN).

Preferably, the content of second toughening agent is within the range of 7.0±6.5 wt.-%, more preferably 7.0±6.0 wt.-%, still more preferably 7.0±5.5 wt.-%, yet more preferably 7.0±5.0 wt.-%, even more preferably 7.0±4.5 wt.-%, most preferably 7.0±4.0 wt.-%, or 7.0±3.5 wt.-%, or 7.0±3.0 wt.-%, or 7.0±2.5 wt.-%, or 7.0±2.0 wt.-%, and in particular 7.0±1.0 wt.-%, in each case relative to the total weight of the two-component system.

Preferably, the two-component system according to the invention comprises a first impact modifier and optionally and preferably, a second impact modifier that differs from the first impact modifier.

For the purpose of the specification, an impact modifier increases the durability of the structural adhesive. Impact modifiers are known to the skilled person (see e.g. Berzins A. P. Impact Modifiers, Chapter 8 in Lutz J. T., Grossmann R. F. Polymer Modifiers and Adhesives (2001), Marcel Dekker).

The structural adhesives formulated with impact modifiers exhibit desirable properties for many adhesive applications. For example, impact modifiers have a similar effect on the cured adhesives as toughening agents in reducing brittleness and increasing impact strength of the cured adhesives. The impact modifiers may also provide improved non-sag and thixotropic properties, and anti-sliding performance in the uncured adhesives.

The impact modifiers according to the invention generally include graft copolymers that may be characterized as core-shell copolymers having a rubbery "core," a hard "shell," and that swell in the methacrylate and/or acrylate monomer compositions but do not dissolve therein. Examples of core-shell copolymers are those where the hard "shell" monomers, such as styrene, acrylonitrile, or methyl methacrylate, are grafted onto a rubbery "core" made from polymers of butadiene, butyl acrylate, ethyl acrylate, isoprene and the like. One type of core-shell polymers is methacrylate butadiene styrene (MBS) copolymer made by polymerizing methyl methacrylate in the presence of polybutadiene or a polybutadiene copolymer rubber. Commercial examples of core shell impact modifiers are Paraloid™ BTA-753, Paraloid 2650A, Paraloid 2691A, Clearstrength® E920, Clearstrength XT 100, and Kane Ace B-564 or Kane Ace M521.

Preferably, the total content of the first impact modifier and the second impact modifier is at least 10 wt.-%, or at least 12.5 wt.-%, more preferably at least 15 wt.-%, still more preferably at least 17.5 wt.-%, yet more preferably at least 20 wt.-%, most preferably at least 22.5 wt.-%, and in particular at least 25 wt.-%, in each case relative to the total weight of the two-component system.

The first toughening agent, the second toughening agent, the first impact modifier and the second impact modifier differ from one another.

Preferably, the first impact modifier is a first core shell impact modifier; preferably a core shell impact modifier having an all-acrylic core shell based on butyl-acrylate rubber. Thus, the first impact modifier preferably is a core-shell copolymer where hard "shell" acrylate monomers (preferably (methyl)methacrylates) are grafted onto a rubbery "core" made from butyl acrylate rubber. First impact modifiers of this type are commercially available (e.g. Paraloid EXL-2300G, Paraloid EXL-2314, Paraloid EXL 3361).

Preferably, the content of the first impact modifier is within the range of 5.0±4.5 wt.-%, more preferably 5.0±4.0 wt.-%, still more preferably 5.0±3.5 wt.-%, yet more preferably 5.0±3.0 wt.-%, even more preferably 5.0±2.5 wt.-%, most preferably 5.0±2.0 wt.-%, and in particular 5.0±1.5 wt.-%, in each case relative to the total weight of the two-component system.

Preferably, the second impact modifier is a second core shell impact modifier. Preferably, the second impact modifier is selected from impact modifiers based on butadiene, isoprene, ethylene-propylene and ethylene-butylene in combination with styrene, acrylonitrile and acrylic monomers; acrylonitrile butadiene styrene (ABS) impact modifiers; methacrylate butadiene styrene (MBS) impact modifiers; and MABS impact modifiers. In a preferred embodiment, the second impact modifier is a (methyl)methacrylate butadiene styrene (MBS) core shell impact modifier. Thus, the second impact modifier preferably is a core-shell copolymer where hard "shell" acrylate monomers (preferably (methyl) methacrylates) are grafted onto a rubbery "core" made from butadiene styrene rubber. Second impact modifiers of this type are commercially available (e.g. Kane Ace™ B564, Kane Ace™ M521, Clearstrength™ XT 100, Paraloid 2650A, Paraloid 2691A, Clearstrength® E920, Clearstrength XT 100). In another preferred embodiment, the second impact modifier is a core shell polybutadiene rubber, which may be dispersed in liquid bisphenol A epoxy resin (e.g. Kane Ace MX257).

Preferably, the content of the second impact modifier is within the range of 25±23 wt.-%, more preferably 25±20 wt.-%, still more preferably 25±17 wt.-%, yet more preferably 25±15 wt.-%, or 25±13 wt.-%, even more preferably 25±11 wt.-%, or 25±10 wt.-%, most preferably 25±8.0 wt.-%, and in particular 25±5.0 wt.-%, or 25±4.0 wt.-%, in each case relative to the total weight of the two-component system.

Preferably, the first component and/or the second component of the two-component system according to the invention comprises a combination of a a first toughening agent selected from (meth)acrylate terminated butadiene-acrylonitrile copolymers, (meth) acrylate (vinyl) terminated butadiene-acrylonitrile copolymers and (meth)acrylate-terminated poly(butadiene-acrylonitrile-acrylic acid) terpolymers; preferably a (meth)acrylate terminated butadiene-acrylonitrile copolymer; and a second toughening agent selected from SBS, SIS, SEP, SEBS, EPR, NBR, EPDM, BR, NR, SBR, POE, Cl-PE, EAA, and EVA; preferably a styrene-butadiene-styrene block-copolymer (SBS); and a first impact modifier being a first core shell impact modifier; preferably a core shell impact modifier having an all-acrylic core shell based on butyl-acrylate rubber; and a second impact modifier being a second core shell impact modifier; preferably selected from impact modifiers based on butadiene, isoprene, ethylene-propylene and ethylene-butylene in combination with styrene, acrylonitrile and acrylic monomers; ABS impact modifiers; MBS impact modifiers; and MABS impact modifiers; preferably a (methyl)methacrylate butadiene styrene (MBS) core shell impact modifier.

In a preferred embodiment, the first component and/or the second component of the two-component system according to the invention comprises a first toughening agent selected from (meth)acrylate terminated butadiene-acrylonitrile copolymers, (meth)acrylate (vinyl) terminated butadiene-acrylonitrile copolymers and (meth)acrylate-terminated poly(butadiene-acrylonitrile-acrylic acid) terpolymers; preferably a (meth)acrylate terminated butadiene-acrylonitrile copolymer and a second toughening agent selected from SBS, SIS, SEP, SEBS, EPR, NBR, EPDM, BR, NR, SBR, POE, Cl-PE, EAA, and EVA; preferably a styrene-butadiene-styrene block-copolymer (SBS), wherein preferably the relative weight ratio of the first toughening agent to the second toughening agent is within the range of 7:1 to 1:7, more preferably 6:1 to 1:6, still more preferably 5:1 to 1:5, yet more preferably 4:1 to 1:4, even more preferably 3:1 to 1:3, most preferably 2:1 to 1:2, and in particular 1.5:1 to 1:1.5.

Preferably, the total content of impact modifiers (first impact modifier+second impact modifier+any potentially present additional impact modifier) is within the range of $27\pm23$ wt.-%, more preferably $27\pm20$ wt.-%, still more preferably $27\pm17$ wt.-%, yet more preferably $27\pm15$ wt.-%, or $27\pm13$ wt.-%, even more preferably $27\pm11$ wt.-%, or $27\pm10$ wt.-%, most preferably $27\pm8.0$ wt.-%, and in particular $27\pm5.0$ wt.-%, or $27\pm4.0$ wt.-%, in each case relative to the total weight of the two-component system.

In a preferred embodiment, the first component and/or the second component of the two-component system according to the invention comprises a first toughening agent selected from (meth)acrylate terminated butadiene-acrylonitrile copolymers, (meth)acrylate (vinyl) terminated butadiene-acrylonitrile copolymers and (meth)acrylate-terminated poly(butadiene-acrylonitrile-acrylic acid) terpolymers; preferably a (meth)acrylate terminated butadiene-acrylonitrile copolymer and a first impact modifier being a first core shell impact modifier; preferably a core shell impact modifier having an all-acrylic core shell based on butyl-acrylate rubber, wherein preferably the relative weight ratio of the first toughening agent to the first impact modifier is within the range of $3\pm2.8:1$, more preferably $3\pm2.5:1$, still more preferably $3\pm2.2:1$, yet more preferably $3\pm1.9:1$, even more preferably $3\pm1.6:1$, most preferably $3\pm1.3:1$, and in particular $3\pm1.0:1$.

In a preferred embodiment, the first component and/or the second component of the two-component system according to the invention comprises a first toughening agent selected from (meth)acrylate terminated butadiene-acrylonitrile copolymers, (meth)acrylate (vinyl) terminated butadiene-acrylonitrile copolymers and (meth)acrylate-terminated poly(butadiene-acrylonitrile-acrylic acid) terpolymers; preferably a (meth)acrylate terminated butadiene-acrylonitrile copolymer and a second impact modifier being a second core shell impact modifier; preferably selected from impact modifiers based on butadiene, isoprene, ethylene-propylene and ethylene-butylene in combination with styrene, acrylonitrile and acrylic monomers; ABS impact modifiers; MBS impact modifiers; and MABS impact modifiers; preferably a (methyl)methacrylate butadiene styrene (IVIBS) core shell impact modifier, wherein preferably the relative weight ratio of the first toughening agent to the second impact modifier is within the range of $1:3\pm2.8$, more preferably $1:3\pm2.5$, still more preferably $1:3\pm2.2$, yet more preferably $1:3\pm1.9$, even more preferably $1:3\pm1.6$, most preferably $1:3\pm1.3$, and in particular $1:3\pm1.0$.

In a preferred embodiment, the first component and/or the second component of the two-component system according to the invention comprises a second toughening agent selected from SBS, SIS, SEP, SEBS, EPR, NBR, EPDM, BR, NR, SBR, POE, Cl-PE, EAA, and EVA; preferably a styrene-butadiene-styrene block-copolymer (SBS) and a first impact modifier being a first core shell impact modifier; preferably a core shell impact modifier having an all-acrylic core shell based on butyl-acrylate rubber, wherein preferably the relative weight ratio of the second toughening agent to the first impact modifier is within the range of within the range of $2\pm1.8:1$, more preferably $2\pm1.6:1$, still more preferably $2\pm1.4:1$, yet more preferably $2\pm1.3:1$, even more preferably $2\pm1.0:1$, most preferably $2\pm0.8:1$, and in particular $2\pm0.6:1$.

In a preferred embodiment, the first component and/or the second component of the two-component system according to the invention comprises a second toughening agent selected from SBS, SIS, SEP, SEBS, EPR, NBR, EPDM, BR, NR, SBR, POE, Cl-PE, EAA, and EVA; preferably a styrene-butadiene-styrene block-copolymer (SBS) and a second impact modifier being a second core shell impact modifier; preferably selected from impact modifiers based on butadiene, isoprene, ethylene-propylene and ethylene-butylene in combination with styrene, acrylonitrile and acrylic monomers; ABS impact modifiers; MBS impact modifiers; and MABS impact modifiers; preferably a (methyl)methacrylate butadiene styrene (MBS) core shell impact modifier, wherein preferably the relative weight ratio of the second toughening agent to the second impact modifier is within the range of $1:3\pm2.8$, more preferably $1:3\pm2.5$, still more preferably $1:3\pm2.2$, yet more preferably $1:3\pm1.9$, even more preferably $1:3\pm1.6$, most preferably $1:3\pm1.3$, and in particular $1:3\pm1.0$.

In a preferred embodiment, the first component and/or the second component of the two-component system according to the invention comprises a first impact modifier being a first core shell impact modifier; preferably a core shell impact modifier having an all-acrylic core shell based on butyl-acrylate rubber and a second impact modifier being a second core shell impact modifier; preferably selected from impact modifiers based on butadiene, isoprene, ethylene-propylene and ethylene-butylene in combination with styrene, acrylonitrile and acrylic monomers; ABS impact modifiers; MBS impact modifiers; and MABS impact modifiers; preferably a (methyl)methacrylate butadiene styrene (MBS) core shell impact modifier, wherein preferably the relative weight ratio of the first impact modifier to the second impact modifier is within the range of $1:3\pm2.8$, more preferably $1:3\pm2.5$, still more preferably $1:3\pm2.2$, yet more preferably $1:3\pm1.9$, even more preferably $1:3\pm1.6$, most preferably $1:3\pm1.3$, and in particular $1:3\pm1.0$.

In a preferred embodiment, the first component and/or the second component of the two-component system according to the invention comprises a first impact modifier being a first core shell impact modifier; preferably a core shell impact modifier having an all-acrylic core shell based on butyl-acrylate rubber; wherein the first impact modifier is preferably contained in the first component;

a second impact modifier being a second core shell impact modifier; preferably selected from impact modifiers based on butadiene, isoprene, ethylene-propylene and ethylene-butylene in combination with styrene, acrylonitrile and acrylic monomers; ABS impact modifiers; MBS impact modifiers; and MABS impact modifiers; preferably a (methyl)methacrylate butadiene styrene (MBS) core shell impact modifier; wherein the second impact modifier is preferably contained in the first component; and a third impact modifier being a third core shell impact modifier, preferably a polybutadiene rubber, which may be dispersed in liquid bisphenol A epoxy resin; wherein the third impact modifier is preferably contained in the second component.

According to this above preferred embodiment, the relative weight ratio of the first impact modifier to the second impact modifier to the third impact modifier is preferably within the range of 1:(6±2.0):(2±1.9), more preferably 1:(6±1.8):(2±1.9), still more preferably 1:(6±1.6):(2±1.9), yet more preferably 1:(6±1.4):(2±1.9), even more preferably 1:(6±1.2):(2±1.9), most preferably 1:(6±1.0):(2±1.9), and in particular 1:(6±0.8):(2±1.9); or 1:(6±2.0):(2±1.9), more preferably 1:(6±2.0):(2±1.9), still more preferably 1:(6±2.0):(2±1.9), yet more preferably 1:(6±2.0):(2±1.9), even more preferably 1:(6±2.0):(2±1.9), most preferably 1:(6±2.0):(2±1.9), and in particular 1:(6±2.0):(2±1.9); or 1:(6±2.0):(2±0.7), more preferably 1:(6±1.8):(2±0.9), still more preferably 1:(6±1.6):(2±1.1), yet more preferably 1:(6±1.4):(2±1.3), even more preferably 1:(6±1.2):(2±1.5), most preferably 1:(6±1.0):(2±1.7), and in particular 1:(6±0.8):(2±1.9).

Preferably, the first component and/or the second component of the two-component system according to the invention additionally comprises an accelerator; preferably a metal di(meth)acrylate; more preferably a metal di(meth) acrylate selected from zinc di(meth)acrylate, aluminum di(meth)acrylate and magnesium di(meth)acrylate; most preferably zinc diacrylate or zinc dimethacrylate. Further accelerators include but are not limited to organic transitional metal compounds, such as copper acetyl acetonate, vanadium acetyl acetonate, and the like. In general, the accelerators may be organic salts of a transition metal, such as cobalt, nickel, manganese or iron naphthenate, copper octoate, copper acetylacetonate, iron hexoate, iron propionate, and the like. Accelerators are commercially available (e.g. Dymalink™ 708, Dymalink™ 709).

In a preferred embodiment, the two-component system according to the invention does not contain a metal di(meth) acrylate accelerator.

As the peroxide polymerization initiator is contained in the second component of the two-component system and as the peroxide polymerization accelerator is preferably present spatially separate from the initiator to prevent premature polymerization (curing), the accelerator is preferably contained in the first component of the two-component system.

Preferably, the content of the accelerator is within the range of 1.0±0.9 wt.-%, more preferably 1.0±0.8 wt.-%, still more preferably 1.0±0.7 wt.-%, yet more preferably 1.0±0.6 wt.-%, even more preferably 1.0±0.5 wt.-%, most preferably 1.0±0.4 wt.-%, and in particular 1.0±0.3 wt.-%, in each case relative to the total weight of the two-component system. When the two-component system comprises more than a single accelerator, the specified content of accelerator refers to the overall content of all accelerators that are contained in the two-component system.

Curatives (or curing agents) may be employed to formulate fast cure structural adhesives. Preferably, the first component of the two-component system according to the invention additionally comprises a curative; preferably a curative selected from N,N-dimethyl-para-toluidine (DMPT), N-(2-hydroxyethyl)-N-methyl-para-toluidine (MHPT), N-methyl-N-(2-hydroxypropyl)-p-toluidine (2HPMT), and N-ethyl-N-(2-hydroxyethyl)-p-toluidine (EHPT); more preferably N-methyl-para toluidine derivatives, N-(2-hydroxyethyl)-N-methyl-para-toluidine, N-ethyl-N-(2-hydroxyethyl)-p-toluidine, or any combination thereof. Curatives are commercially available (e.g. Firstcure™ MHPT).

Preferably, the content of the curative is within the range of 1.0±0.9 wt.-%, more preferably 1.0±0.8 wt.-%, still more preferably 1.0±0.7 wt.-%, yet more preferably 1.0±0.6 wt.-%, even more preferably 1.0±0.5 wt.-%, most preferably 1.0±0.4 wt.-%, and in particular 1.0±0.3 wt.-%, in each case relative to the total weight of the two-component system. When the two-component system comprises more than a single curative, the specified content of curative refers to the overall content of all curatives that are contained in the two-component system.

Preferably, the first component of the two-component system according to the invention additionally comprises an adhesion promoter; preferably a phosphate-ester-based adhesion promoter; more preferably an adhesion promoter selected from the group consisting of 2-methacryloyloxy-ethyl phosphate, bis(2-methacryloyl-oxyethyl phosphate), 2-acryloyloxyethyl phosphate, bis(2-acryloyloxyethyl phosphate), methyl-(2-meth-acryloyloxyethyl phosphate), ethyl-(2-methacryloyl-oxyethyl phosphate), and mixtures of 2-hydroxyethyl methacrylate monophosphate and diphosphate esters; most preferably (meth)acrylate phosphate esters such as 2-hydroxyethyl methacrylate phosphate ester, 2-hydroxy-ethyl acrylate phosphate ester, or any combination thereof. Suitable phosphate-ester-based adhesion promoters are commercially available (e.g. Miramer™ A99, Miramer™ SC1400).

In a preferred embodiment, the two-component system according to the invention does not contain a phosphate-ester-based adhesion promoter.

Preferably, the content of the adhesion promoter is within the range of 2.5±2.4 wt.-%, more preferably 2.5±2.2 wt.-%, still more preferably 2.5±2.0 wt.-%, yet more preferably 2.5±1.8 wt.-%, even more preferably 2.5±1.6 wt.-%, or 2.5±1.5 wt.-%, most preferably 2.5±1.4 wt.-%, and in particular 2.5±1.2 wt.-%, or 2.5±1.0 wt.-%, in each case relative to the total weight of the two-component system. When the two-component system comprises more than a single adhesion promoter, the specified content of adhesion promoter refers to the overall content of all adhesion promoters that are contained in the two-component system.

Preferably, the first component of the two-component system according to the invention additionally comprises a cure indicator; preferably a triphenylmethane derivative, e.g. bis(dimethylamino)triphenylmethane or tris(dimethyl-amino)triphenylmethane Cure indicators change their color during the polymerization and curing reaction thereby visually indicating the progress of polymerization and curing. Suitable cure indicators are disclosed in e.g. WO 98/34980 and US 2013/292054, both incorporated by reference.

Preferably, the content of the cure indicator is at most 0.10 wt.-%, more preferably at most 0.09 wt.-%, still more preferably at most 0.08 wt.-%, yet more preferably at most 0.07 wt.-%, even more preferably at most 0.06 wt.-%, most preferably at most 0.05 wt.-%, in each case relative to the total weight of the two-component system. Preferably, the cure indicator is contained at a concentration that is so low that the cure indicator as such has no influence of the progress of the polymerization and curing reaction.

Preferably, the first component of the two-component system according to the invention additionally comprises a stabilizer (sometimes also referred to as inhibitor or retardant); preferably a stabilizer selected from the group consisting of phenols, quinones, hydroquinones, thiazines, phenothiazines, N-oxyls, aromatic amines, phenylenediamines, sulfonamides, oximes, hydroxylamines, urea derivatives, phosphorus compounds, sulfur compounds and metal salts; more preferably hydroquinone derivatives such as methyl ethers of hydroquinones, e.g. mono-tert-butyl hydroquinone (MTBHQ), monomethylether of hydroquinone, di-tert-butyl hydroquinone (DTBHQ), or 2,6-di-tert-butyl-4-methylphenol, 6-di-tert-butyl-4-(dimethylaminomethyl)phenol, phenothiazine derivatives such as 10H-phenothiazine, or any combination thereof.

Such stabilizers are normally used to prevent premature polymerization and curing and to help the radical polymerization initiator to provide for a desired and consistent cure profile, and thus a consistent working time. Further examples include but are not limited to combinations of butylated hydroxytoluene (BHT or 2,6-di-tert-butyl-p-cresol) and quinone(s), which commonly may be employed for medium and long open time adhesives. A specific example of an inhibitor/retardant system is a combination of butylated hydroxytoluene (BHT) and hydroquinone (HQ).

Preferably, the content of the stabilizer is within the range of 0.001 to 2.0 wt.-%, more preferably 0.001 to 1.0 wt.-%, still more preferably 0.001 to 0.5 wt.-%, in each vase relative to the total weight of the two-component system.

Preferably, the first component and/or the second component of the two-component system according to the invention additionally comprises a filler; preferably an inorganic filler; more preferably a filler selected from kaolin, silica, talc, calcium carbonate, carbon black, titanium oxides, and the pigments used to color material; most preferably bentonite clays, kaolinite clays such as kaolin, metakaolin, or any combination thereof. Preferably, the filler is thixotropic.

In a preferred embodiment of the invention, the viscosity of the first component and/or the second component is controlled by adjusting type and amount of first impact modifier and optionally, second modifier. According to this embodiment, the nature and amount of filler preferably does not or not significantly contribute to the viscosity of the first component and/or the second component. According to this embodiment, the filler essentially may serve the purposes of reducing costs, providing color (pigment), improving reinforcement (e.g. fibers), and the like.

In another preferred embodiment of the invention, the viscosity of the first component and/or the second component is controlled by adjusting type and amount of filler. According to this embodiment, thixotropic fillers are preferred.

In preferred embodiments, the content of the filler is not more than 25 wt.-%, more preferably not more than 20 wt.-%, still more preferably not more than 17.5 wt.-%, yet more preferably not more than 15 wt.-%, even more preferably not more than 12.5 wt.-%, most preferably not more than 10 wt.-%, and in particular not more than 7.5 wt.-%, in each case relative to the total weight of the two-component system. In preferred embodiments, the content of the filler is not more than 5.0 wt.-%, more preferably not more than 4.5 wt.-%, still more preferably not more than 4.0 wt.-%, yet more preferably not more than 3.5 wt.-%, even more preferably not more than 3.0 wt.-%, most preferably not more than 2.5 wt.-%, and in particular not more than 2.0 wt.-%, in each case relative to the total weight of the two-component system Preferably, the content of the filler is within the range of 5.0±4.8 wt.-%, more preferably 5.0±4.4 wt.-%, still more preferably 5.0±4.0 wt.-%, yet more preferably 5.0±3.6 wt.-%, even more preferably 5.0±3.2 wt.-%, most preferably 5.0±2.8 wt.-%, and in particular 5.0±2.4 wt.-%, in each case relative to the total weight of the two-component system.

Preferably, the first component and/or the second component of the two-component system according to the invention additionally comprises a polymer; preferably a polyester, polyamide, polyurethane, cellulose ether, epoxy resin, polyolefin, or any combination thereof.

It has been found that the epoxy resin inter alia increases $T_g$ of the structural adhesive.

Preferably, the epoxy resin comprises epoxy functional groups that are capable of reacting e.g. with the carboxylic acid functional groups of the (meth)acrylic acid. In order to avoid premature reaction, the epoxy resin is preferably contained in the second component, i.e. spatially separate from the (meth)acrylic acid that is contained in the first component.

Exemplary epoxy resins include but are not limited to phenolic resins, which may be a novolac type or other type resin. Other preferred epoxy resins include bisphenol-A epichlorohydrin ether polymer, or a bisphenol-A epoxy resin which may be modified with butadiene or another polymeric additive, or bisphenol-F-type epoxy resins. Moreover, various mixtures of several different epoxy resins may be employed as well. Examples of suitable epoxy resins are sold under the tradename DER330, DER331, Araldite™ GY 250, Araldite™ GY 260, Araldite™ GY 282, Araldite™ GY 281, Araldite™ GY 285, YD128, Epikote® 828, DER 354, Epikote™ 862, Epikote™ 864, Epikote™ 869.

Preferably, the content of the polymer is within the range of 3.0±2.8 wt.-%, more preferably 3.0±2.5 wt.-%, still more preferably 3.0±2.2 wt.-%, yet more preferably 3.0±1.9 wt.-%, even more preferably 3.0±1.5 wt.-%, most preferably 3.0±1.2 wt.-%, and in particular 3.0±0.9 wt.-%, in each case relative to the total weight of the two-component system.

Preferably, the relative weight ratio of the first component to the second component is within the range of from 20:1 to 1:1, preferably 18:1 to 2:1, more preferably 16:1 to 4:1, still more preferably 15:1 to 5:1, yet more preferably 14:1 to 6:1, even more preferably 13:1 to 7:1, most preferably 12:1 to 8:1, and in particular 11:1 to 9:1.

Preferably, the relative volume ratio of the first component to the second component is within the range of from 20:1 to 1:1, preferably 18:1 to 2:1, more preferably 16:1 to 4:1, still more preferably 15:1 to 5:1, yet more preferably 14:1 to 6:1, even more preferably 13:1 to 7:1, most preferably 12:1 to 8:1, and in particular 11:1 to 9:1.

A skilled person recognizes that other relative weight ratios can easily be realized and thus are also contemplated.

The two-component system according to the invention is characterized by several advantages compared to conventional two-component structural adhesives.

The two-component system according to the invention preferably provides gap filling of up to 100 mm without boiling, preferably at open times within the range of only 4 to 6 minutes. Gap filling is preferably determined in accordance with ASTM method D3931-93a.

The two-component system according to the invention preferably provides an elongation at break of at least 70%, or of at least 75%, more preferably at least 80%, still more preferably at least 82%, yet more preferably at least 84%, even more preferably at least 86%, most preferably at least 88%, and in particular at least 90%, preferably in each case at a Young's modulus of at least 500 MPa; or of at least 70%, or of at least 75%, more preferably at least 80%, still more preferably at least 82%, yet more preferably at least 84%, even more preferably at least 86%, most preferably at least 88%, and in particular at least 90%, preferably in each case at a Young's modulus of at least 600 MPa; or of at least 70%, or of at least 75%, more preferably at least 80%, still more preferably at least 82%, yet more preferably at least 84%, even more preferably at least 86%, most preferably at least 88%, and in particular at least 90%, preferably in each case at a Young's modulus of at least 700 MPa.

Young's modulus and elongation at break are preferably determined in accordance with ASTM method D638.

The two-component system according to the invention preferably provides a very high T-peel strength without sacrificing lap shear strength, elongation at break or Young's modulus. Preferably, the two-component system according to the invention provides a T-peel strength of at least 8.0 N/mm, or at least 9.0 N/mm, or at least 10 N/mm, or at least 11 N/mm, more preferably at least 11.5 N/mm, still more preferably at least 12 N/mm, yet more preferably at least 12.5 N/mm, even more preferably at least 13 N/mm, most preferably at least 13.5 N/mm, and in particular at least 14 N/mm. The T-peel strength is preferably determined in accordance with ASTM method D1876-08(2015).

The two-component system according to the invention preferably provides a lap shear strength of at least 15 MPa, more preferably at least 16 MPa, still more preferably at least 17 MPa, yet more preferably at least 18 MPa, even more preferably at least 19 MPa, most preferably at least 20 MPa, and in particular at least 21 MPa. The lap shear strength is preferably determined in accordance with ASTM method D1002.

The two-component system according to the invention preferably exhibits a shrinkage determined using a rheometer or a pycnometer of not more than 18 vol.-%, more preferably not more than 17 vol.-%, still more preferably not more than 16 vol.-%, yet more preferably not more than 15 vol.-%, even more preferably not more than 14 vol.-%, most preferably not more than 13 vol.-% or not more than 12 vol.-%, and in particular not more than 10 vol.-%.

Conventional methods for the determination of shrinkage using a rheometer (e.g. TA Instruments AR/DHR and ARES-G2) or a pycnometer (e.g. Micromeritics AccuPyc® II 1340) are known to the skilled person.

Conventional methods for preparing two-component systems with a first component that is spatially separated from a second component in order to prevent premature reaction are know to the skilled person. Certain ingredients, such as the toughening agents and impact modifiers may be apportioned between the first component and the second component to provide for a similar viscosity of the first component and the second component. As indicated, the volume ratio and/or weight ratio between the first component and the second component can vary greatly, for example, from 15:1 to 1:1. In some embodiments, the ratio between the first component and the second component is 10:1 by volume or weight.

It should be noted that the order of addition in making the first component and the second component can vary greatly. Moreover, the commercial preparation of the first component and the second component may also involve making stock or premix solutions, cooling the formulations at intermediate and final steps, degassing the formulations under a vacuum, and the like. As appreciated by a skilled person, equipment that may be employed in making the first component and the second component include vessels, piping, valves, transfer pumps, vacuum pumps, mixers (e.g., high speed agitators or dispersers), and so forth. The first component and the second component may be delivered to the end-user in differing types of containers, ranging from small cartridges to drums, and the like.

After preparation of the first component and the second component of the two-component system according to the invention, the two components may be stored in inventory by the manufacturer, the distributor, end-user, and the like. The first component and the second component may alternatively be used or applied soon after transport (without intermediate storage) to bond substrates. However, it is common for either the manufacturer or the user to store the first component and the second component prior to combination and use of the two components. Thus, it is generally beneficial to have a consistent cure profile over the shelf life of the first component and the second component Again, it is generally desirable for the user to know the behavior of the cure profile (e.g., peak exotherm temperature and time) to appropriately manage the application of the two-component system and the construction/bonding of the structural components, pieces, parts, and the like. Therefore, ingredients, such as cure profile regulators, cure accelerators, and stabilizers are added to the two-component system to provide for a more consistent cure profile. These ingredients may be added to the first component, to the second component, or to both.

To apply the adhesive, the first component and the second component are combined or mixed together, (e.g., through a static mixer). The combined first component and the second component may then be applied to a first substrate and/or a second substrate. After such application, the first substrate and the second substrate may be adhered to one another via the applied structural adhesive, i.e. via the combined first component and the second component. Lastly, the adhesive is allowed to cure, typically at ambient or room temperature.

The open time (working time) is generally regarded as the time allowable between when the two-component system is mixed/applied to parts and parts must be mated. This amount of time is determined by the cure rate of the two-component system and is, therefore, also dependent on temperature and the mass of the two-component system. For the purpose of the specification, open time is the time span which may elapse after the first component and the second component have been mixed with one another and immediately thereafter have been applied to substrates, but before the substrates are mated, which still provides essentially equivalent bond strength after mating of substrates and complete curing of the adhesive. Open time is determined in a comparative experiment comparing bond strengths with one another. In the reference experiment, the first component and the second component are mixed with one another, immediately thereafter the mixture is applied to substrates, and immediately thereafter the substrates are mated. The adhesive is allowed to fully cure and the thus achieved bond strength is the reference bond strength. In a series of test experiments, the first component and the second component are mixed with one another, immediately thereafter the mixture is applied to substrates, but before the substrates are mated, in each case a predetermined time span elapses. After the substrates have been mated, the adhesive is again allowed to fully cure and the thus achieved bond strengths are the test bond strengths. When a given test bond strength is essentially equivalent compared to the reference bond strength, the corresponding elapsed time span is within the open time. When a given test bond strength is not essentially equivalent compared to the reference bond strength, the corresponding elapsed time span is outside the open time.

For the purpose of the specification, the open time is defined as the maximum time span that may elapse thereby still delivering essentially equivalent bond strength as the reference bond strength, i.e. as if the substrates were immediately mated upon initial application of the mixed two components. In this context "essentially equivalent" bond strength is commonly understood to be within 10% of the bond strength achieved with immediate mating of the substrates. Further, bond strength is commonly expressed in terms of lap shear strength reported as the failure stress in the adhesive, which is calculated by dividing the failing load by the bond area. Preferably, the lap shear strength is determined according to ASTM method D1002.

Preferably, open time is measured through the Delayed Mating Open Time (DMOT) test. In this test, adhesive is applied to a series of 2.54 cm (1")×10.16 cm (4") aluminum coupons as quickly as possible, then coupons are mated with a delay of successively longer intervals of time, with 1.27 cm (0.5") overlap between the two coupons and a 254 μm (10 mil) bond line thickness. The adhesive is then allowed to cure completely (typically overnight), and the coupons are pulled apart in shear. The results of lap shear strength (LSS) and failure mode (adhesive vs. cohesive) are compared for each coupon to one mated with effectively zero delay, and the end of the open Time is then judged by a reduction in strength of >10% of the original and/or reduction in cohesive failure to <80% (>20% adhesive failure).

Preferably, the open time of the two-component system according to the invention is within the range of 3 to 15 minutes, preferably 4 to 14 minutes. In a preferred embodiment, the open time is within the range of 3 to 7 minutes, preferably 4 to 6 minutes. In another preferred embodiment, the open time is within the range of 11 to 15 minutes, preferably 12 to 14 minutes.

For the purpose of the specification, the time to handling strength (curing time, fixture time) is defined as the time required after the mixture of the first component and the second component has been applied and mated for the bond strength to exceed a value of 0.689 MPa (100 psi). A longer open time typically results in a longer time to handling strength. It is generally most desirable to have a time to handling strength that is minimally longer than the open time, sometimes referred to as "snap cure" or "cure on command" Typically, final bond strength after curing is complete is much higher than 0.689 MPa (100 psi), typically greater than 10 MPa.

Preferably, time to handling strength is measured through the Rate of Bond Strength Development (ROBSD) test. In this test, adhesive is applied to a series of 2.54 cm (1")× 10.16 cm (4") aluminum coupons which are then immediately mated to a second coupon with 1.27 cm (0.5") overlap and a 254 μm (10 mil) bond line thickness. The coupons are then pulled apart in shear over successively longer intervals of time, evaluating the lap shear strength over time as the adhesive cures and bond strength increases. The time to handling strength is judged by the time that it takes for the bond strength to reach 0.689 MPa (100 psi).

Preferably, the time to handling strength of the two-component system according to the invention is within the range of 7 to 28 minutes, preferably 8 to 27 minutes. In a preferred embodiment, the time to handling strength is within the range of 7 to 11 minutes, preferably 8 to 10 minutes. In another preferred embodiment, the time to handling strength is within the range of 24 to 28 minutes, preferably 25 to 27 minutes.

Open time and time to handling strength can be purposefully adjusted by varying type and individual amount of adhesion promoter, accelerator, curative, stabilizer, and peroxide polymerization initiator. Thus, adjusting open time and time to handling strength can be achieved by routine experimentation. When the amount/concentration of adhesion promoter is increased, the open time and the time to handling strength are typically extended. When the amount/concentration of accelerator is increased, the time to handling strength is typically shortened. When the amount/concentration of curative is increased, the open time and the time to handling strength are shortened. When the amount/concentration of the stabilizer is increased, the open time and the time to handling are typically extended. The individual effect of the peroxide polymerization initiator depends upon the nature and amount of monomers to be polymerized.

Another aspect of the invention relates to the use of a two-component system according to the invention as described above as structural adhesive.

Another aspect of the invention relates to a method of bonding two substrates comprising the steps of (a) mixing the first component as described above and the second component as described above with one another thereby providing a combined first component and the second component;

(b) applying the combined first component and the second component obtained in step (a) to a first substrate and/or a second substrate;

(c) optionally, allowing time to elapse prior to expiry of the open time, e.g. for performing some other action;

(d) adhering the first substrate and the second substrate to one another; and (e) allowing the combined first component and the second component to cure thereby providing a cured structural adhesive.

Another aspect of the invention relates to a container comprising the first component and optionally also the second component spatially separate from the first component.

Preferably, the container is a cartridge.

The invention is further illustrated by the following examples which are not to be construed as limiting its scope.

Two-component systems are manufactured comprising a first component and a second component having the following ingredients at the following weight contents. The two components are mixed with one another and applied to a substrate.

EXAMPLES 1 TO 7 (PROPHETIC)

| ingredient [wt-%[1]] | Ex. 1 | Ex. 2 | Ex. 3 | Ex. 4 | Ex. 5 | Ex. 6 | Ex. 7 |
|---|---|---|---|---|---|---|---|
| first component (10 parts per weight): | | | | | | | |
| acrylic acid | 2.85 | — | 3.63 | 4.06 | 4.16 | 4.32 | 5.00 |
| methacrylic acid | — | 2.93 | — | — | — | — | — |
| methyl methacrylate | 48.59 | — | 43.05 | 45.02 | 45.13 | — | 36.58 |
| methyl acrylate | — | 41.98 | — | — | — | 36.46 | — |
| hydroxypropyl acrylate | 4.32 | — | — | — | — | — | 13.63 |
| hydroxypropyl methacrylate | — | 6.38 | 6.42 | 7.32 | 7.54 | 12.45 | — |
| isobornyl acrylate | 0.13 | 3.34 | 3.45 | 3.52 | 4.83 | 5.00 | 5.32 |
| first liquid toughening agent | 6.00 | 6.00 | 6.00 | 4.00 | 4.00 | 4.00 | 2.00 |
| second solid toughening agent | 8.00 | 7.00 | 6.00 | 5.00 | 4.00 | 3.00 | 2.00 |
| first core shell impact modifier | 5.33 | 6.23 | 6.33 | 7.02 | 8.54 | 8.63 | 8.90 |
| second core shell impact modifier | 4.32 | 6.38 | 6.42 | 7.32 | 7.54 | 12.45 | 13.63 |
| adhesion promoter A | 5.32 | 5.00 | — | 2.64 | — | 1.31 | 1.20 |
| adhesion promoter B | — | — | 4.32 | — | 1.50 | — | — |
| accelerator | 3.02 | 2.83 | 2.64 | 2.50 | 1.83 | 1.64 | 1.32 |
| curative | 3.02 | 2.83 | 2.64 | 2.50 | 1.83 | 1.64 | 1.32 |
| stabilizer | 0.02 | 0.02 | 0.02 | 0.02 | 0.02 | 0.02 | 0.02 |
| TOTAL | 90.92 | 90.92 | 90.92 | 90.92 | 90.92 | 90.92 | 90.92 |
| second component (1 part per weight): | | | | | | | |
| peroxide polymerization initiator | 3.00 | 3.27 | 3.38 | 3.54 | 3.83 | 4.00 | 4.13 |
| first core shell impact modifier | 4.88 | 4.49 | 4.27 | 4.06 | 3.69 | 3.41 | 3.23 |
| inorganic filler | 1.20 | 1.32 | 1.43 | 1.48 | 1.56 | 1.67 | 1.72 |
| TOTAL | 9.08 | 9.08 | 9.08 | 9.08 | 9.08 | 9.08 | 9.08 |

[1]relative to the total weight of the two-component system, i.e. after the first component and the second component have been mixed with one another

30

EXAMPLE 8

| ingredient | function | [wt.-%[2]] |
|---|---|---|
| first component (10 parts): | | |
| methacrylic acid | (meth)acrylic acid | 4.40 |
| methyl methacrylate | $C_{1-6}$-alkyl (meth)acrylate | 29.98 |
| hydroxyethyl methacrylate | hydroxy-$C_{1-6}$-alkyl (meth)acrylate | 11.50 |
| isobornyl methacrylate | cycloalkyl (meth)acrylate | 3.90 |
| (meth)acrylate terminated butadiene-acrylonitrile copolymer | first toughening agent | 9.00 |
| styrene-butadiene-styrene block-copolymer | second toughening agent | 7.20 |
| all-acrylic core shell based on butyl-acrylate rubber | first core shell impact modifier | 3.70 |
| methacrylate butadiene styrene copolymer | second core shell impact modifier | 25.00 |
| toluidine derivative | curative | 1.20 |
| Zn dimethacrylate | accelerator | 1.15 |
| Leuco violet | cure indicator | 0.05 |
| hydroquinone derivative | stabilizer | 0.02 |
| phosphate methacrylate | adhesion promoter | 2.90 |
| TOTAL | | 100.00 |
| second component (1 part): | | |
| dibenzyol peroxide | peroxide polymerization initiator | 57.00 |
| core-shell poly(butadiene) rubber dispersion | third core shell impact modifier | 36.00 |
| amorphous precipitated silica | filler | 7.00 |
| TOTAL | | 100.00 |

[2]relative to the total weight of the single components

EXAMPLES 9 TO 13

| ingredient [wt.-%$^3$] | function | Ex. 9 | Ex. 10 | Ex. 11 | Ex. 12 | Ex. 13 |
|---|---|---|---|---|---|---|
| first component (10 parts): | | | | | | |
| methacrylic acid | (meth)acrylic acid | 4.40 | 4.74 | 4.84 | 5.13 | 5.46 |
| methyl methacrylate | C$_{1-6}$-alkyl (meth)acrylate | 30.03 | 30.23 | 30.82 | 32.67 | 35.10 |
| 2-hydroxyethyl methacrylate | hydroxy-C$_{1-6}$-alkyl (meth)-acrylate | 11.50 | 12.39 | 12.64 | 13.40 | 16.89 |
| isobornyl methacrylate | isobornyl methacrylate | 3.90 | 4.20 | 4.29 | 4.54 | 4.83 |
| (meth)acrylate terminated butadiene-acrylonitrile copolymer | first toughening agent | 9.00 | 9.70 | — | 10.48 | — |
| styrene - butadiene - styrene block-copolymer | second toughening agent | 7.20 | — | 7.91 | 8.39 | — |
| all-acrylic core shell based on butyl-acrylate rubber | first core shell impact modifier | 3.70 | 3.99 | 4.07 | 16.95 | 3.88 |
| methacrylate butadiene styrene (MBS) copolymer | second core shell impact modifier | 25.00 | 26.94 | 27.47 | — | 26.23 |
| toluidine derivative | curative | 1.20 | 1.29 | 1.32 | 1.40 | 1.26 |
| Zn dimethacrylate | accelerator | 1.15 | 1.24 | 1.26 | 1.34 | 1.21 |
| hydroquinone derivative | stabilizer | 0.02 | 2.16 | 2.20 | 2.33 | 2.10 |
| phosphate methacrylate | adhesion promoter | 2.90 | 3.13 | 3.19 | 3.38 | 3.04 |
| TOTAL | | 100.00 | 100.00 | 100.00 | 100.00 | 100.00 |
| second component (1 part): | | | | | | |
| peroxide polymerization initiator | | 35.48 | 35.48 | 35.48 | 35.48 | 35.48 |
| bisphenol-F type epoxy resin | | 30.55 | 30.55 | 30.55 | 30.55 | 30.55 |
| all-acrylic core shell based on butyl-acrylate rubber | first core shell impact modifier | 10.2 | 10.2 | 10.2 | 10.2 | 10.2 |
| anhydrous aluminum silicate | inorganic filler | 20.44 | 20.44 | 20.44 | 20.44 | 20.44 |
| black epoxy resin | | 3.33 | 3.33 | 3.33 | 3.33 | 3.33 |
| TOTAL | | 100.00 | 100.00 | 100.00 | 100.00 | 100.00 |

$^3$relative to the total weight of the single components

EXAMPLES 14 TO 17

| ingredient [wt.-%$^4$] | | Ex. 14 | Ex. 15 | Ex. 16 | Ex. 17 |
|---|---|---|---|---|---|
| first component (10 parts): | | | | | |
| methacrylic acid | (meth)acrylic acid | 7.73 | 7.72 | 7.98 | 7.65 |
| methyl methacrylate | C$_{1-6}$-alkyl (meth)acrylate | 32.91 | 32.87 | 33.99 | 32.57 |
| 2-hydroxyethyl methacrylate | hydroxy-C$_{1-6}$-alkyl (meth)-acrylate | 20.21 | 20.19 | 15.65 | 15.92 |
| isobornyl methacrylate | isobornyl methacrylate | | | | — |
| butyldiglycol methacrylate | glycolether (meth)acrylate | | | | 5.00 |
| (meth)acrylate terminated butadiene-acrylonitrile copolymer | first toughening agent | | | | — |
| styrene-butadiene-styrene block-copolymer | second toughening agent | | | 7.31 | — |
| all-acrylic core shell based on butyl-acrylate rubber | first core shell impact modifier | 6.58 | 6.57 | 6.80 | 6.51 |
| methacrylate butadiene styrene (MBS) copolymer | second core shell impact modifier | 25.52 | 25.50 | 20.87 | 25.26 |
| toluidine derivative | curative | 1.73 | 1.21 | 1.25 | 1.20 |
| Zn dimethacrylate | accelerator | | 0.61 | 0.63 | 0.60 |
| hydroquinone derivative | stabilizer | 2.22 | 2.22 | 2.30 | 2.20 |
| phosphate methacrylate | adhesion promoter | 3.12 | 3.11 | 3.22 | 3.09 |
| TOTAL | | 100.00 | 100.00 | 100.00 | 100.00 |
| second component (1 part): | | | | | |
| peroxide polymerization initiator | | 35.48 | 35.48 | 35.48 | 35.48 |
| bisphenol-F type epoxy resin | | 30.55 | 30.55 | 30.55 | 30.55 |
| all-acrylic core shell based on butyl-acrylate rubber | first core shell impact modifier | 10.2 | 10.2 | 10.2 | 10.2 |

-continued

| ingredient [wt.-%[4]] | | Ex. 14 | Ex. 15 | Ex. 16 | Ex. 17 |
|---|---|---|---|---|---|
| anhydrous aluminum silicate | inorganic filler | 20.44 | 20.44 | 20.44 | 20.44 |
| coloring paste | | 3.33 | 3.33 | 3.33 | 3.33 |
| TOTAL | | 100.00 | 100.00 | 100.00 | 100.00 |

[4]relative to the total weight of the single components

Characterization:

| | Ex. 8 | Ex. 9 | Ex. 10 comparative | Ex. 11 comparative | Ex. 12 | Ex. 13 comparative |
|---|---|---|---|---|---|---|
| first toughening agent | + | + | + | − | + | − |
| second toughening agent | + | + | − | + | + | − |
| first impact modifier | + | + | + | + | + | + |
| second impact modifier | + | + | + | + | − | + |
| Lap shear Alu 5754 abraded (MPa) - 1 mm bondline | 18.0 55% cf | 15.4 100% cf | 15.7 95% CF | 15.7 100% CF | 15.7 100% CF | 22.1 100% CSF |
| Lap shear Alu 5754 abraded (MPa) - 0.3 mm bondline | 25 100% cf | N/A | N/A | N/A | N/A | N/A |
| Lap shear Stainless steel (MPa) - 0.3 mm gap | N/A | N/A | N/A | N/A | N/A | N/A |
| Youngs modulus E [MPa] | 649 | 700 | 1143 | 1102 | 1181 | 1375 |
| Tensile strength s [MPa] | 17.9 | 17.7 | 20.3 | 20.3 | 20.3 | 26 |
| Elongation at break [%] | 110 | 107 | 62.3 | 19 | 8.4 | 5 |
| T-peel strength (N/mm - facies) | 9.3 80% cf | 15 | N/A | N/A | N/A | N/A |
| Shrinkage [%] | 16.6 | N/A | N/A | N/A | N/A | N/A |
| Max gap fill [mm] | >100 | N/A | N/A | N/A | N/A | N/A |
| Sag | 0 mm OK | OK | OK | OK | OK | OK |
| Wedge impact | 26.6 N/mm 12.1 J | N/A | N/A | N/A | N/A | N/A |
| Open time [min] | 4-6 | 4 | 4 | 2.5 | 4 | 8.5 |
| Fixture time [min] | 8 | N/A | N/A | N/A | N/A | N/A |
| Exothermic time [min] (10 g) | N/A | 10 (105.5° C.) | 11 (104.5° C.) | 17 (90.1° C.) | 15 (99.7° C.) | 11 (117° C.) |

| | Ex. 14 comparative | Ex. 15 comparative | Ex. 16 comparative | Ex. 17 comparative |
|---|---|---|---|---|
| first toughening agent | − | − | − | − |
| second toughening agent | − | − | + | − |
| first impact modifier | + | + | + | + |
| second impact modifier | + | + | + | + |
| Lap shear Alu 5754 abraded (MPa) - 1 mm bondline | N/A | N/A | N/A | N/A |
| Lap shear Alu 5754 abraded (MPa) - 0.3 mm bondline | 21.1 100% SCF | 20.8 100% SCF | 21.4 100% CF | 19.9 100% SCF |
| Lap shear Stainless steel (MPa) - 0.3 mm gap | 26.5 100% SCF | 25.6 100% SCF | 22.8 100% SCF | 26.2 100% SCF |
| Youngs modulus E [MPa] | 1071 | 1265 | 1036 | N/A |
| Tensile strength s [MPa] | 23.1 | 26.2 | 19.4 | N/A |
| Elongation at break [%] | 6.3 | 10 | 10.6 | N/A |
| T-peel strength (N/mm - facies) | 5.5 100% CF | 4.65 100% CF | 9.81 100% CF | 4.96 100% CF |
| Shrinkage [%] | N/A | N/A | N/A | N/A |
| Max gap fill [mm] | N/A | N/A | N/A | N/A |
| Sag | N/A | N/A | N/A | N/A |
| Wedge impact | N/A | N/A | N/A | N/A |
| Open time [min] | 18-22 (at 24° C.) | 12 (at 27.2° C.) | 8 (at 26° C.) | 14-15 (at 26° C.) |
| Fixture time [min] | RT = 24° C. MT = 22.4° C. 41 min/97.9° C. | RT = 27.2° C. MT = 25.5° C. 23 min/129° C. | RT = 26° C. MT = 24.4° C. 23 min/120.3° C. | RT = 26° C. MT = 23.9° C. 27 min/118.2° C. |
| Exothermic time [min] (10 g) | N/A | N/A | N/A | N/A |

RT = room temperature;
MT = material temperature

As demonstrated by the above data, the inventive two-component system comprising first and second toughening agent as well as first and second impact modifier provides improved Lap shear (at alu 5754 abraded 0.3 mm bondline; Ex. 8 vs. Ex. 14-17).

Further, as demonstrated by the above data, the inventive two-component system comprising first and second toughening agent as well as first and second impact modifier provides improved elongation at break (Ex. 8-9 vs. Ex. 10-16).

Still further, as demonstrated by the above data, the inventive two-component system comprising first and second toughening agent as well as first and second impact modifier provides improved T-peel strength (N/mm—facies; Ex. 8-9 vs. Ex. 14-17).

The invention claimed is:

1. An amine-free, two-component system of reduced odor of a (i) first component comprising a (meth)acrylic acid, a $C_{1-6}$-alkyl (meth)acrylate, a hydroxy-$C_{1-6}$-alkyl (meth)acrylate, and additionally a cycloalkyl (meth)acrylate, and/or a glycolether (meth)acrylate according to general formula (I), $$CH2=CR—C(=O)—O—[CH2CH2-O]n-CmH2m+1, \quad (I),$$

wherein R is —H or —CH3; index n is an integer within the range of from 1 to 12; and index m is an integer within the range of from 1 to 8; and (ii) a second component comprising a peroxide polymerization initiator;

wherein the first component and/or the second component additionally comprise a liquid first toughening agent; a solid second toughening agent differing from the first toughening agent; a first core shell impact modifier; and optionally, a second core shell impact modifier differing from the first impact modifier;

wherein the first component and the second component are spatially separated from one another; and wherein the reaction of the first component and the second component after mixing results in a structural adhesive.

2. The two-component system according to claim 1, wherein the (meth)acrylic acid is methacrylic acid or acrylic acid;

the $C_{1-6}$-alkyl (meth)acrylate is methyl (meth)acrylate or ethyl (meth)acrylate; and the hydroxy-$C_{1-6}$-alkyl (meth)acrylate is hydroxyethyl (meth)acrylate or hydroxypropyl (meth)acrylate.

3. The two-component system according to claim 1, wherein the cycloalkyl (meth)acrylate is isobornyl acrylate or isobornyl methacrylate.

4. The two-component system according to claim 1, wherein the (meth)acrylic acid is methacrylic acid.

5. The two-component system according to claim 1, wherein the first toughening agent is a (meth)acrylate terminated butadiene-acrylonitrile copolymer.

6. The two-component system according to claim 1, wherein the second toughening agent is a styrene-butadiene-styrene block-copolymer (SBS).

7. The two-component system according to claim 1, wherein the first impact modifier is a core shell impact modifier having an all-acrylic core shell based on butyl-acrylate rubber (excluding (methyl)methacrylate butadiene styrene).

8. The two-component system according to any of the preceding claims, wherein the content of the first toughening agent is within the range of 8.0±6.0 wt.-%, relative to the total weight of the two-component system.

9. The two-component system according to claim 1, wherein the content of the second toughening agent is within the range of 7.0±5.0 wt.-%, relative to the total weight of the two-component system.

10. The two-component system accordingly to claim 1, wherein the content of the first impact modifier is within the range of 5.0-4.0 wt.-%, relative to the total weight of the two-component system.

11. The two-component system according to claim 1, wherein the second impact modifier is a (methyl)methacrylate butadiene styrene (MBS) core shell impact modifier.

12. The two-component system according to claim 1, wherein the content of the second impact modifier is within the range of 25=20 wt.-%, relative to the total weight of the two-component system.

13. The two-component system according to claim 1, wherein the total content of the first impact modifier and the second impact modifier is at least 10 wt.-%, relative to the total weight of the two-component system.

14. Use of a two-component system according to claim 1 as a structural adhesive with a method of bonding two substrates comprising the steps of:

(a) mixing the first component as defined in claim 1 and the second component as defined in claim 1 with one another thereby providing a combined first component and a second component;

(b) applying the combined first component and second component obtained in step (a) to a first substrate and/or a second substrate;

(c) optionally, allowing time to elapse prior to expiry of the open time;

(d) adhering the first substrate and the second substrate to one another; and (e) allowing the combined first component and second component to cure thereby providing a cured structural adhesive.

15. The two-component system according to claim 1, wherein the structural adhesive retains its bonding strength and mechanical integrity at elevated temperatures, including temperatures especially above 120° C., such that it continues to effectively bond substrates without degradation in performance.

* * * * *